(12) United States Patent
Lee et al.

(10) Patent No.: US 12,513,869 B2
(45) Date of Patent: Dec. 30, 2025

(54) COMPUTER POWER SUPPLY UNIT

(71) Applicant: Cooler Master Technology Inc., Taipei (TW)

(72) Inventors: I-Chia Lee, Taipei (TW); Jen-Chih Cheng, Taipei (TW); Jui-Tse Yin, Taipei (TW)

(73) Assignee: COOLER MASTER TECHNOLOGY INC., Taipei (TW)

( * ) Notice: Subject to any disclaimer, the term of this patent is extended or adjusted under 35 U.S.C. 154(b) by 153 days.

(21) Appl. No.: 18/458,103

(22) Filed: Aug. 29, 2023

(65) Prior Publication Data

US 2025/0081417 A1    Mar. 6, 2025

(30) Foreign Application Priority Data

Mar. 10, 2023  (TW) .................................. 112202106
May 15, 2023   (DE) .......................... 202023102634.6

(51) Int. Cl.
*H05K 7/20*    (2006.01)
*G06F 1/18*    (2006.01)
(Continued)

(52) U.S. Cl.
CPC ......... *H05K 7/20936* (2013.01); *G06F 1/189* (2013.01); *G06F 1/206* (2013.01);
(Continued)

(58) Field of Classification Search
CPC ............. H05K 7/20409; H05K 7/1432; H05K 7/20936; H05K 7/209; H05K 7/20909; H05K 7/20336; H05K 7/20154; H05K 7/2039; H05K 7/20509; H05K 7/20254; H05K 1/0203; H05K 1/181; H05K 2201/064; H05K 7/20263; G06F 1/20; G06F 2200/201; G06F 1/181; G06F 1/206; G06F 1/189; G06F 1/26; F28F 2215/10; F28F 13/00; F28F 2275/14; F28F 3/048; F28F 9/001; H01L 23/3672; H01L 23/427

See application file for complete search history.

(56) References Cited

U.S. PATENT DOCUMENTS 4,872,102 A * 10/1989 Getter ................... H02M 7/003
                                                         361/709
6,046,908 A *  4/2000 Feng ................... H05K 7/20154
                                                         361/730

(Continued)

*Primary Examiner* — Michael A Matey
(74) *Attorney, Agent, or Firm* — Merchant & Gould P.C.

(57) ABSTRACT

A computer power supply unit including a housing, a main board disposed in the housing, at least one high heat producing component disposed on the main board, at least one other heat producing component disposed on the main board, and a heat transfer system is provided. The heat transfer system comprises bottom and top heat transfer devices. Thermal paths are formed between the bottom heat transfer device and a bottom panel of the housing and the top heat transfer device and a top panel of the housing to dissipate heat from an at least one high heat component assembly, formed in part by the at least one high heat producing component, and an at least one other heat component assembly, formed in part by the at least one other heat producing component, to an outside of the bottom panel and an outside of the top panel.

18 Claims, 18 Drawing Sheets

(51) Int. Cl.
*G06F 1/20* (2006.01)
*H05K 7/14* (2006.01)

(52) U.S. Cl.
CPC ....... *H05K 7/1432* (2013.01); *H05K 7/20336* (2013.01); *H05K 7/209* (2013.01); *H05K 7/20909* (2013.01)

(56) References Cited

U.S. PATENT DOCUMENTS

| | | | | |
|---|---|---|---|---|
| 6,081,425 A * | 6/2000 | Cheng | ................ | G06F 1/203 |
| | | | | 165/122 |
| 7,136,286 B2 * | 11/2006 | Chuang | ............. | H05K 7/20409 |
| | | | | 361/730 |
| 7,272,001 B2 * | 9/2007 | Cheng | ................ | G06F 1/20 |
| | | | | 174/547 |
| 7,359,203 B2 * | 4/2008 | Chen | ................ | H05K 7/209 |
| | | | | 361/625 |
| 7,773,378 B2 * | 8/2010 | Lin | ................ | H05K 7/20409 |
| | | | | 361/721 |
| 7,813,131 B2 * | 10/2010 | Liang | ................ | F21V 23/02 |
| | | | | 174/547 |
| 7,855,891 B1 * | 12/2010 | Ayres, III | ......... | H05K 7/20445 |
| | | | | 174/547 |
| 11,076,501 B2 * | 7/2021 | Pedoeem | ............ | H05K 7/20154 |
| 2005/0201061 A1 * | 9/2005 | Nikfar | ................ | H05K 7/20336 |
| | | | | 165/104.33 |
| 2012/0247735 A1 * | 10/2012 | Ito | ................ | H01L 23/427 |
| | | | | 165/104.21 |
| 2012/0281360 A1 * | 11/2012 | Nicol | ................ | G16H 20/13 |
| | | | | 29/825 |
| 2013/0056178 A1 * | 3/2013 | Matsunaga | ............ | H01L 23/427 |
| | | | | 165/104.21 |
| 2016/0088762 A1 * | 3/2016 | Wu | ................ | G06F 1/203 |
| | | | | 165/80.2 |
| 2016/0088769 A1 * | 3/2016 | Hsiao | ................ | G06F 1/203 |
| | | | | 165/104.26 |
| 2016/0295679 A1 * | 10/2016 | Yeini | ................ | H05K 7/20336 |
| 2017/0055367 A1 * | 2/2017 | Shen | ................ | G06F 1/203 |
| 2018/0213687 A1 * | 7/2018 | Lu | ................ | H05K 7/20254 |
| 2019/0335621 A1 * | 10/2019 | Szostek | ................ | H05K 7/20172 |
| 2020/0352054 A1 * | 11/2020 | Schmit | ................ | H05K 7/20327 |
| 2021/0132670 A1 * | 5/2021 | Hua | ................ | G06F 1/20 |
| 2022/0142010 A1 * | 5/2022 | Mao | ................ | H05K 7/20872 |
| | | | | 361/699 |
| 2022/0272865 A1 * | 8/2022 | Chien | ................ | H05K 7/20409 |
| 2022/0312633 A1 * | 9/2022 | Zhang | ................ | H05K 7/20163 |
| 2023/0098181 A1 * | 3/2023 | Jaggers | ................ | G06F 1/182 |
| | | | | 361/699 |

* cited by examiner

COMPUTER POWER SUPPLY UNIT

STATEMENT REGARDING PRIOR DISCLOSURES BY THE INVENTOR OR A JOINT INVENTOR

The following disclosures are submitted under 35 U.S.C. 102(b)(1)(A): Taiwan application no. 112202106, filed on Mar. 10, 2023 and German application no. 202023102634.6, filed on May 15, 2023.

TECHNICAL FIELD

The present disclosure is related to the field of heat transfer in general and more particularly but not limited to computer power supply units.

BACKGROUND OF THE INVENTION

Computer power supply units (PSUs) are electrical devices that convert electric current from a source to at least one suitable voltage, current (amperage or 'amp'), and frequency to power electronic devices such as computers, servers, or other devices and systems.

One type of computer PSU can convert alternating current (A/C) supplied from an outlet to multiple direct current (D/C) needed for proper operation of different computer components. As different components such as central processing units (CPUs) and graphic processing units (GPUs) increase in functionality, so does overall power requirements of the computer, and in turn, power supply of the computer PSU. As an example, power consumption of high-end gaming computers can surpass 1.000 watts when under heavy loads. When power is undersupplied to a computer, damage and failure of components can cause display irregularities, program crashes, or in extreme instances, an inability to power on. When inadequate power is supplied to a computer, a PSU can overheat causing computer components to malfunction, overheat, or in extreme instances, be permanently damaged. For all PSUs, efficiency and reliability can be attributed to cooling methods of the PSUs.

Several techniques have been developed for extracting heat from heat producing components in PSUs such as bridge rectifiers, MOSFETs, main transformers, and ferrite coils as examples. Three such techniques are conduction cooling, convection cooling and forced air cooling. For all three techniques, heat moves from a heat source to an object, or through a medium that is cooler. Some devices used in PSUs which apply one or more of the cooling techniques include heatsinks and fans.

Heatsinks having a flat base plate and a plurality of fins dissipate heat by conduction and convection cooling. A large surface area of the flat base plate in thermal communication with a heat producing component initially spreads heat by conduction cooling before the plurality of fins transfer the heat away by convection cooling. One method to increase heat dissipation of efficient heatsinks is to increase its size. However, this option is generally not available given a particular PSU form factor dimension and limited or no additional clearance space within PSU cases.

Built in fans may be used to enhance the convection process in a PSU by forced air cooling. However, in addition to reliability concerns due to dust, dirt or the like being sucked into the PSU case and fan maintenance, and replacement costs, noise and vibration increases as load of PSUs increase requiring higher fan rotations per minutes (RPMs).

SUMMARY OF THE INVENTION

The present disclosure provides a computer power supply unit including a housing, at least one high heat producing component and at least one other heat producing component, both disposed on a main board, and a heat transfer system including a bottom heat transfer device and a top heat transfer device, so as to provide five-sided cooling using minimal clearance space, maximizing and enhancing cooling efficiency, increasing reliability, decreasing opportunity for inadequate power to be supplied to the heat producing components, and decreasing the opportunity for malfunction, overheating, or permanent damaged of the heat producing components.

In at least one embodiment, the computer power supply unit, includes a housing, a main board, at least one high heat producing component, at least one other heat producing component, and a heat transfer system. The housing is configured to contain heat producing components therein and formed from a thermally conductive material. The housing includes a bottom panel, a top panel, a pair of opposing side panels, a rear panel, and a front panel. The top panel is opposite the bottom panel and the pair of opposing side panels is between the bottom panel and top panel. The rear panel is between the bottom panel and top panel and between the pair of opposing side panels and the front panel is opposite the rear panel and between the bottom panel and top panel and between the pair of opposing side panels. The main board is configured to contain circuit parts therein and is disposed inside of the housing. The main board has a top board side and a bottom board side. The bottom board side is disposed facing the bottom panel of the housing. The at least one high heat producing component is disposed on the top board side. The at least one high heat producing component form a portion of an at least one high heat component assembly. The at least one high heat component assembly further includes at least one high heat solder protruding from the bottom board side. The at least one other heat producing component is disposed on the top board side. The at least one other heat producing component form a portion of an at least one other heat component assembly. The at least one other heat component assembly further includes at least one other heat solder protruding from the bottom board side. The heat transfer system includes a bottom heat transfer device and a top heat transfer device. The bottom heat transfer device is disposed embedded in the bottom panel. The top heat transfer device is disposed encompassed by the top panel. The bottom heat transfer device is in thermal communication with the at least one high heat solder and the at least one other heat solder. The top heat transfer device is in thermal communication with a top of the at least one high heat producing component. A bottom thermal path is formed between the bottom heat transfer device and the bottom panel to dissipate heat from the at least one high heat producing component via the at least one high heat solder and dissipate heat from the at least one other heat producing component via the at least one other heat solder to an outside of the bottom panel. A top thermal path is formed between the top heat transfer device and the top panel to dissipate heat from the at least one high heat producing component and dissipate heat from the at least one other heat producing component to an outside of the top panel.

In at least one embodiment, the at least one high heat producing component includes at least one of a main transformer or a bridge rectifier, or any combination of the foregoing. In at least one embodiment, the at least one high heat producing component includes two or more at least one high heat producing component, and the computer power supply further includes a plurality of heatsinks disposed in contact with the two or more at least one high heat producing components.

In at least one embodiment, each of the pair of opposing side panels is integrally formed with the bottom panel and each of the pair of opposing side panels and the bottom panel are configured as heatsinks. In at least one embodiment, the top panel includes a main portion, a ventilation portion, and a pair of opposing top side panels. The pair of opposing top side panels protrude from opposing perimeter edges of the ventilation portion. The main portion is configured as a heatsink. In at least one embodiment, the top heat transfer device includes a plurality of L-shaped heat pipes. Each of the plurality of L-shaped heat pipes include a first leg and a second leg connected to the first leg, whereby the plurality of L-shaped heat pipes is embedded in the main portion. In at least one embodiment, the heat transfer system further includes a heatsink casing, a top thermal interface material, and a top heatspreader. The heatsink casing encompasses the at least one high heat producing component. The top thermal interface material is disposed in contact with a top of the heatsink casing. The top heatspreader is disposed in contact with the top thermal interface material and each of the first legs of the plurality of L-shaped heat pipes. In at least one embodiment, the computer power supply unit further includes a second high heat producing component and the heat transfer system further includes a second heatsink casing encompassing the second high heat producing component, a second top thermal interface material, and a second top heatspreader. The second top thermal interface material is disposed in contact with a top of the second heatsink casing. The second top heatspreader is disposed in contact with the second top thermal interface material and each of the second legs of the plurality of L-shaped heat pipes. In at least one embodiment, the plurality of L-shaped heat pipes include four adjacent L-shaped heat pipes.

In at least one embodiment, each of the pair of opposing side panels is integrally formed with the bottom panel and each of the pair of opposing side panels are configured as heatsinks. In at least one embodiment, the top panel includes a central portion and a pair of ventilation portions. The central portion is configured as a heatsink and disposed between the pair of ventilation portions. In at least one embodiment, the top heat transfer device includes a plurality of straight heat pipes. The plurality of straight heat pipes is embedded in the central portion. In at least one embodiment, the heat transfer system further includes a heatsink casing, a top thermal interface material, and a top heatspreader. The heatsink casing encompasses the at least one high heat producing component. The top thermal interface material is disposed in contact with a top of the heatsink casing. The top heatspreader is disposed in contact with the top thermal interface material and a portion of each of the plurality of straight heat pipes.

In at least one embodiment, the top panel includes a fan ventilation portion and a pair of opposing top side panels and the top heat transfer device includes a fan. The pair of opposing top side panels protrude from opposing perimeter edges of the fan ventilation portion. The fan is encompassed by the top panel. In at least one embodiment, the computer power supply unit further includes a second high heat producing component, and the heat transfer system further includes a heatsink casing and a second heatsink casing. The heatsink casing encompasses the at least one high heat producing component and the second heatsink casing encompasses the second high heat producing component.

In at least one embodiment, the bottom heat transfer device includes a first u-shaped heat pipe having a first base and a first pair of arms. The first pair of arms extend in a same direction from each end of the first base. In at least one embodiment, the heat transfer system further includes a bottom thermal interface material disposed in contact with the at least one high heat solder and a bottom heatspreader disposed in contact with the bottom thermal interface material and a portion of the first base. In at least one embodiment, the bottom heat transfer device further includes a modified z-shaped heat pipe having a straight base and two arms. The two arms extend in opposite directions from each end of the straight base. The straight base is disposed next to the first base. The bottom heat transfer device further includes a second u-shaped heat pipe having a second base and a second pair of arms and a third u-shaped heat pipe having a third base and a third pair of arms. The second pair of arms extend in a same direction from each end of the second base. The third pair of arms extend in a same direction from each end of the third base. The third u-shaped heat pipe is smaller than the second u-shaped heat pipe. The second base is disposed next to the straight base opposite of the first base. The second pair of arms extend in a direction opposite the first pair of arms. The third base is disposed next to the second base opposite of the straight base. The third pair of arms extend in a direction which is the same as the second pair of arms. A portion of the straight base, a portion of the second base and a portion of the third base are all in contact with the bottom heatspreader.

BRIEF DESCRIPTION OF DRAWINGS

Unless specified otherwise, the accompanying drawings illustrate aspects of the innovative subject matter described herein. Referring to the drawings, wherein like reference numerals indicate similar parts throughout the several views, several examples of computer power supply units incorporating aspects of the presently disclosed principles are illustrated by way of example, and not by way of limitation.

DETAILED DESCRIPTION

Figure 1A:
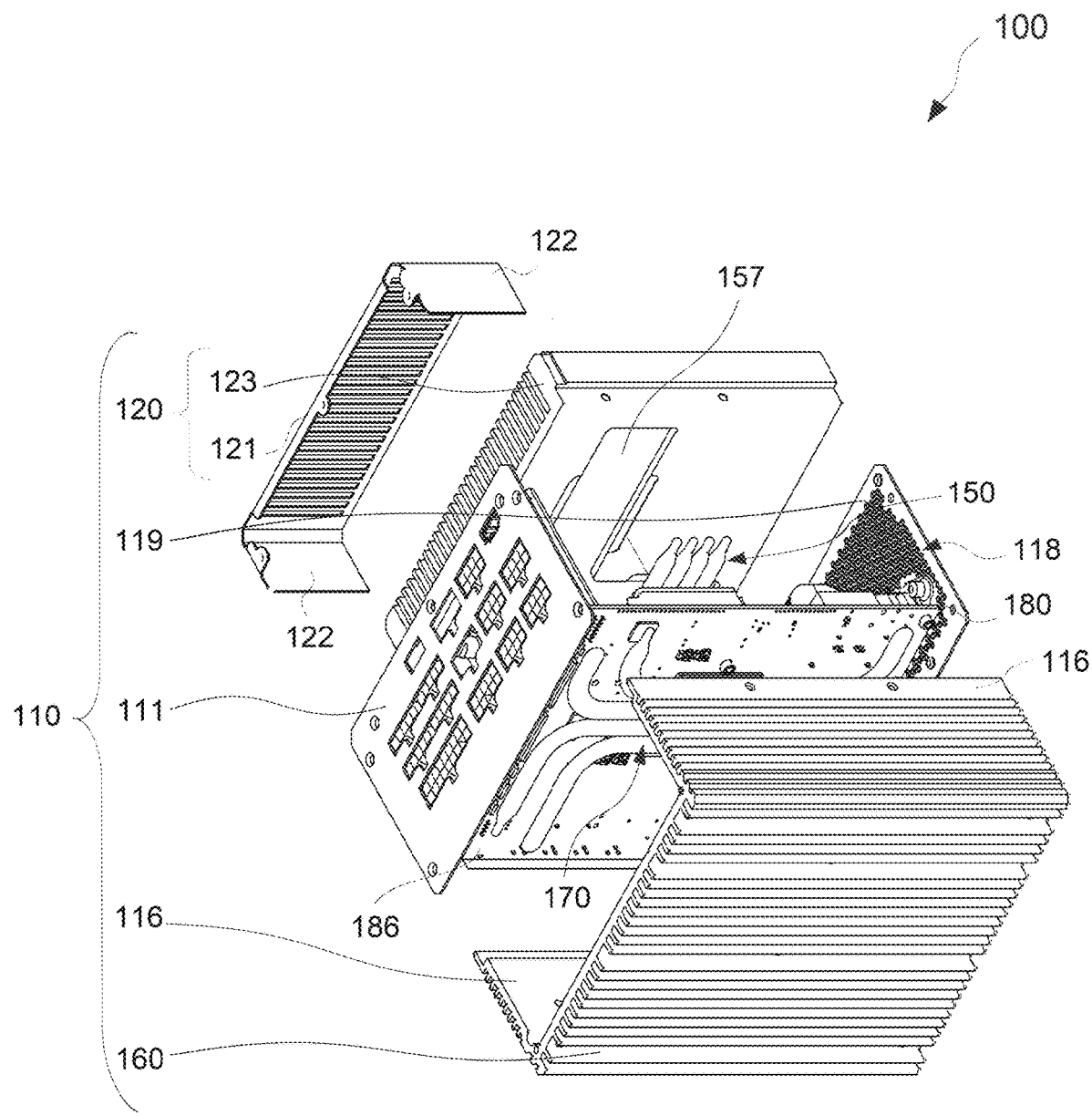
FIG. 1A is an exploded view of a computer power supply unit according to one embodiment of the present disclosure.
Figure 1B:
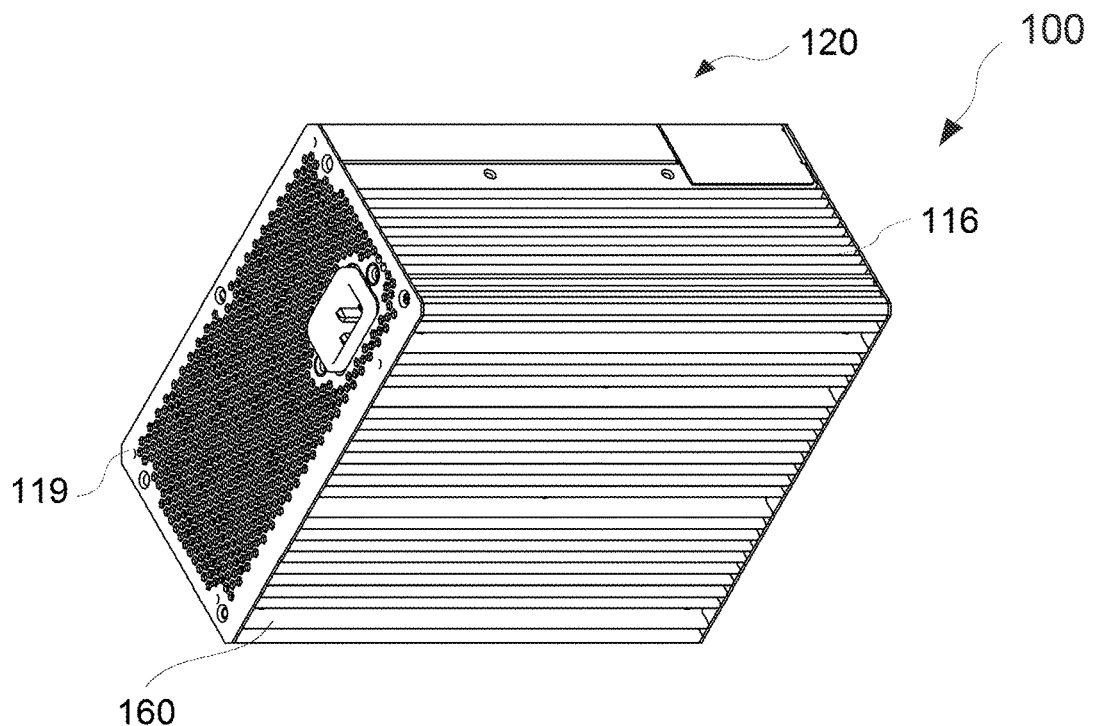
FIG. 1B is a perspective view of the computer power supply unit in FIG. 1A.
Figure 1C:
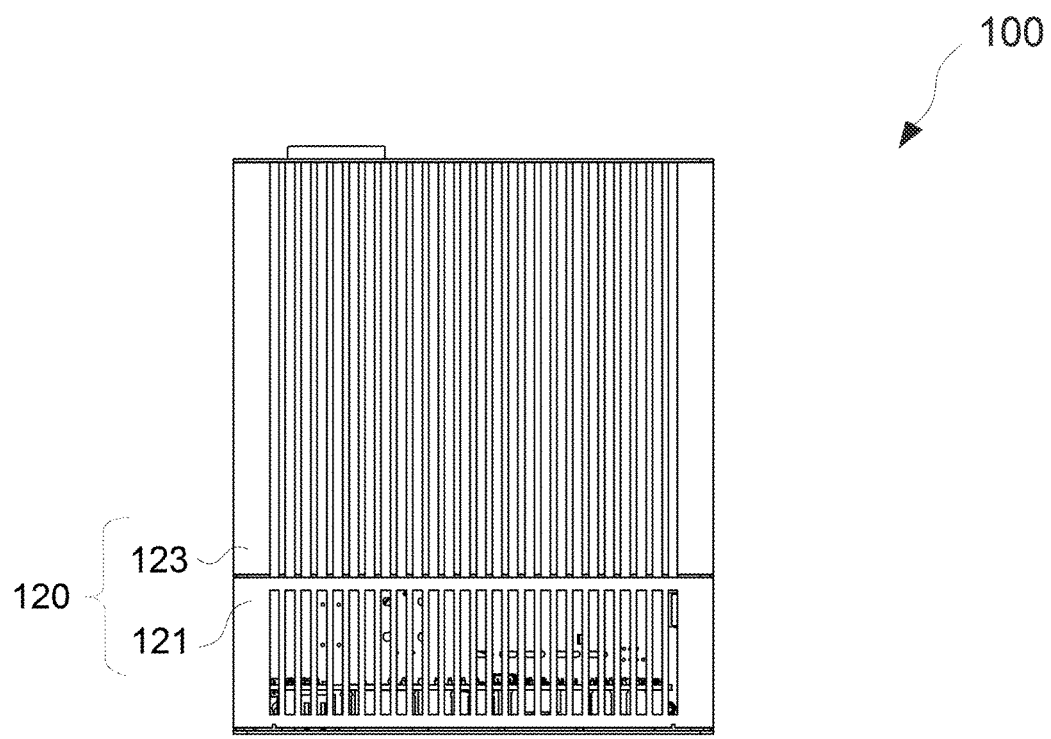
FIG. 1C is a top view of the computer power supply unit in FIG. 1A.
Figure 2A:
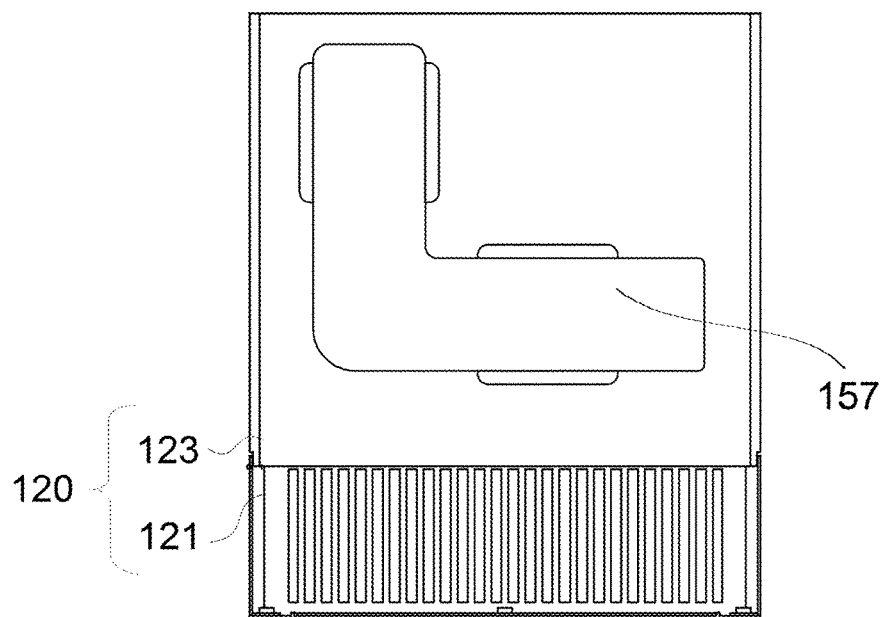
FIG. 2A is an internal view of the top panel of the computer power supply unit in FIGS. 1A-1C.
Figure 2B:
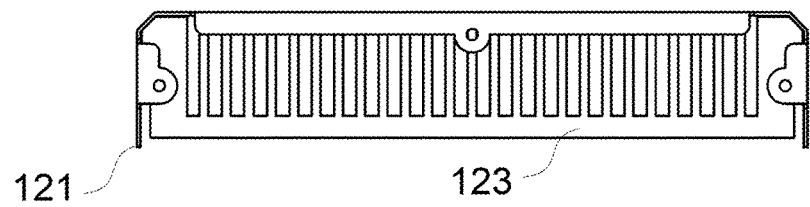
FIG. 2B is a front side view of the top panel in FIG. 2A.
Figure 3:
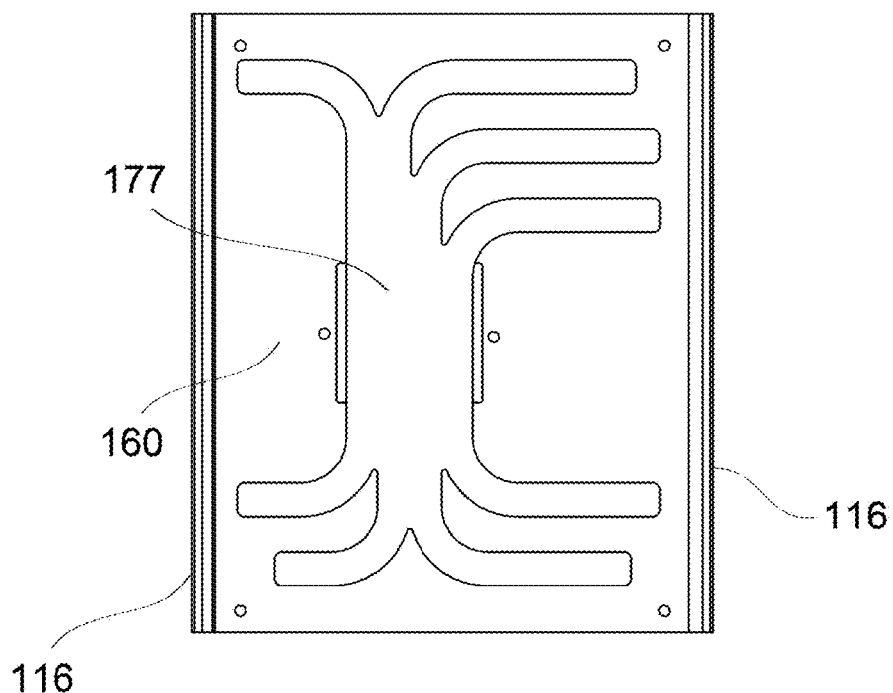
FIG. 3 is an internal view of the bottom panel of the computer power supply unit in FIGS. 1A-1C.
Figure 4:
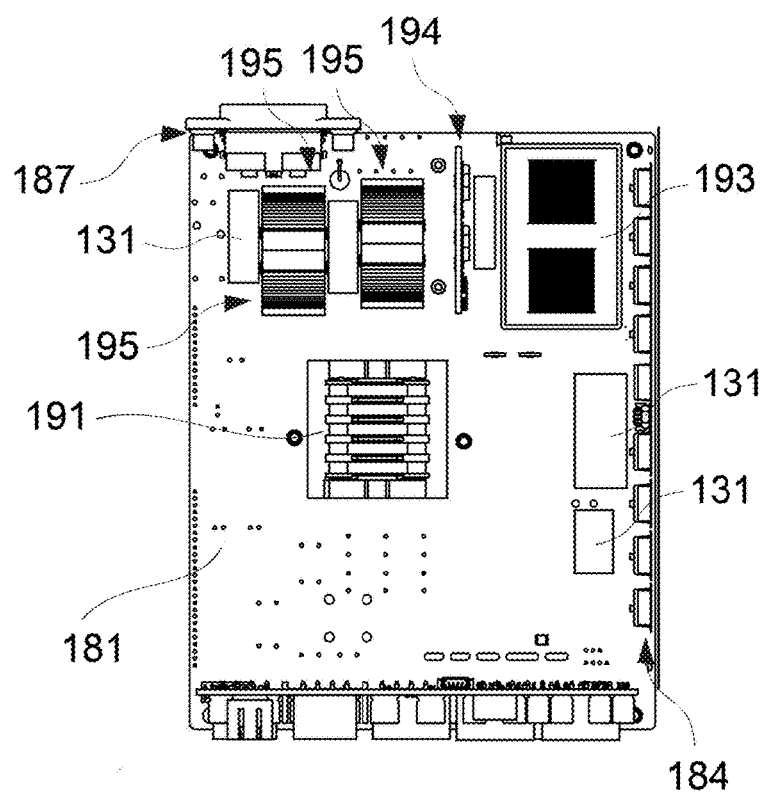
FIG. 4 is a top view of heat producing components of the computer power supply unit in FIGS. 1A-1C.
Figure 5:
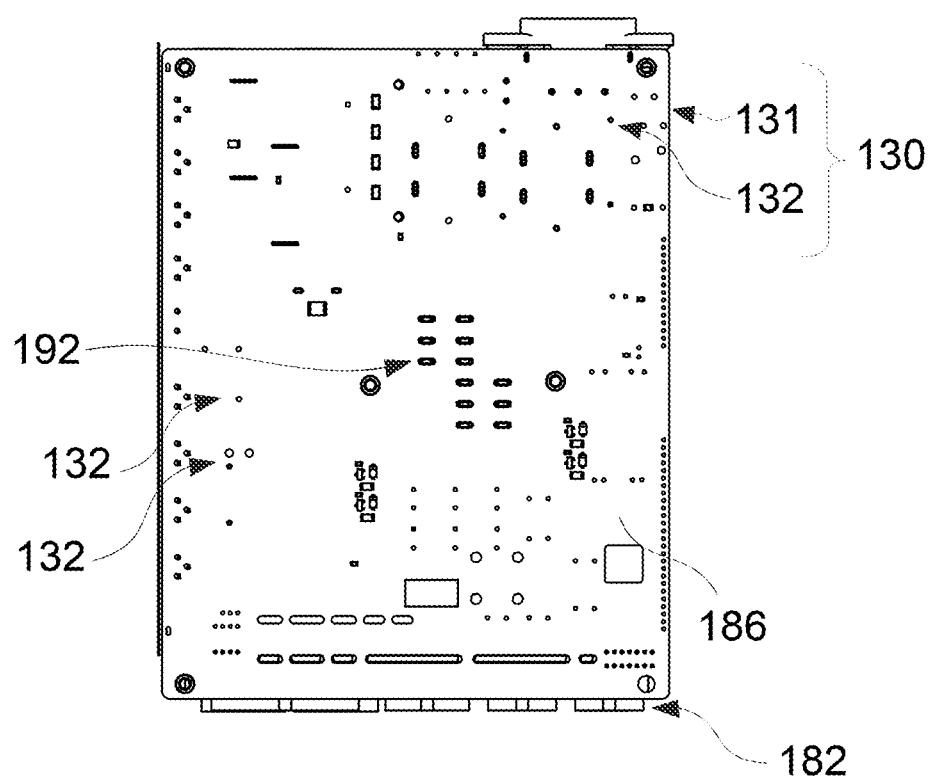
FIG. 5 is a bottom view of heat producing components of the computer power supply unit in FIGS. 1A-1C.
Figure 6:
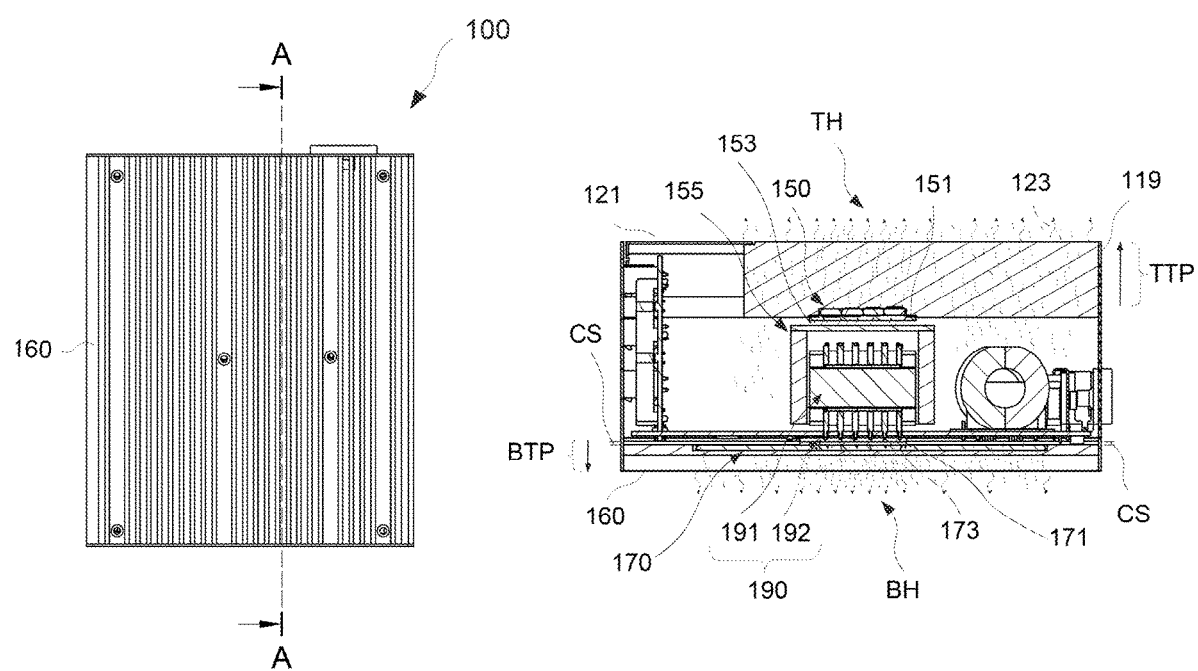
FIG. 6 is a cross-sectional view of thermal paths of the computer power supply unit in FIGS. 1A-1C.
Figure 7:
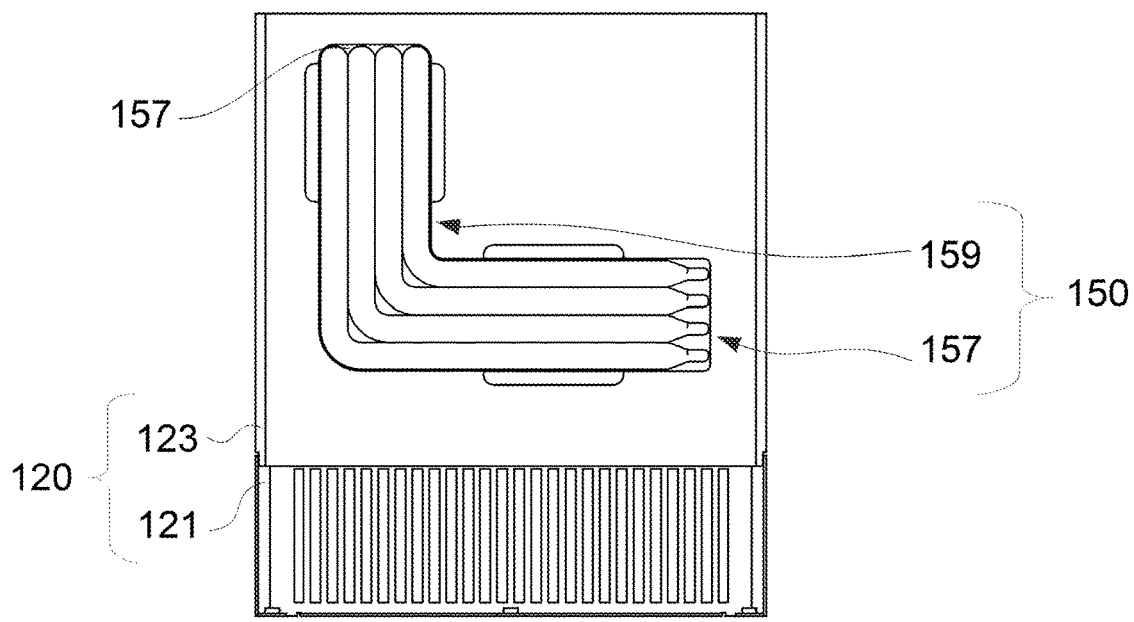
FIG. 7 is an internal view of the top heat transfer device embedded in the top panel of the computer power supply unit in FIGS. 1A-1C.
Figure 8:
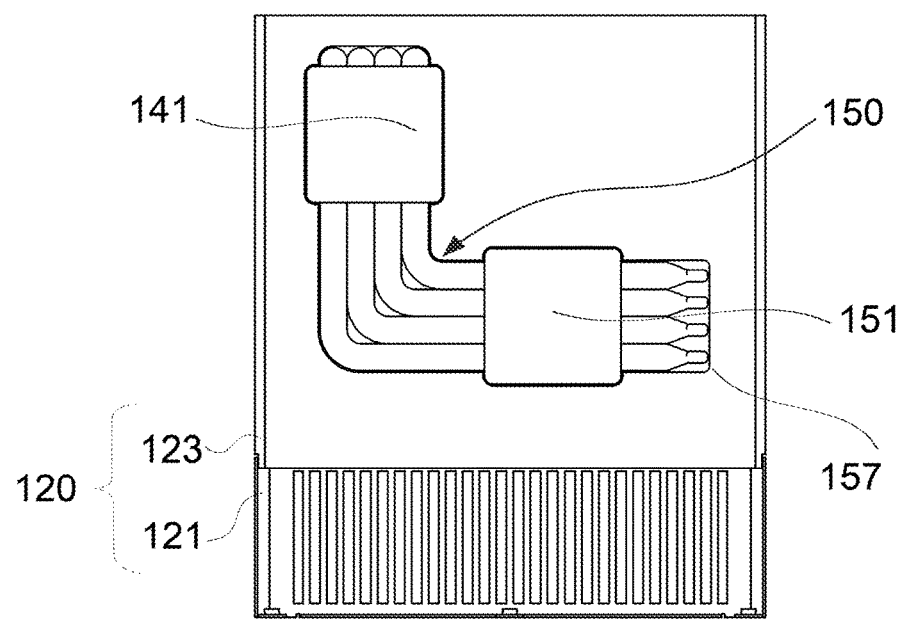
FIG. 8 is an internal view of the top heatspreader coupled to the top heat transfer device embedded in the top panel of the computer power supply unit in FIGS. 1A-1C.
Figure 9:
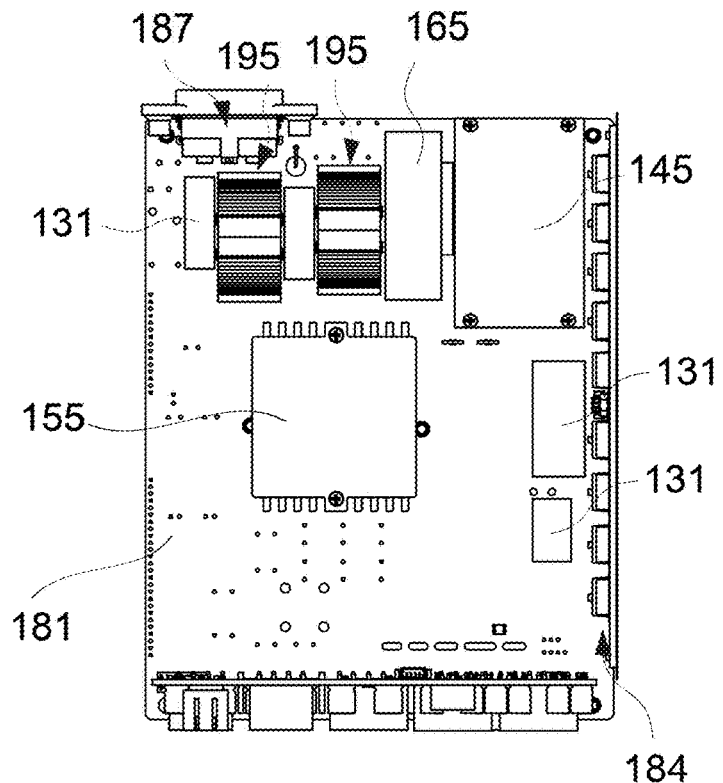
FIG. 9 is an internal top view of the computer power supply unit in FIGS. 1A-1C.
Figure 10:
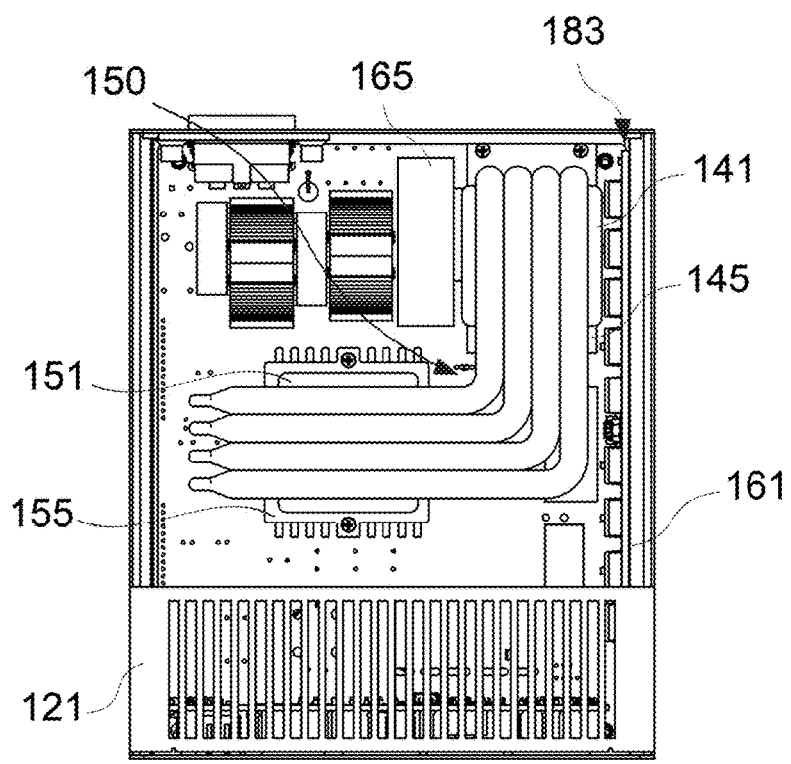
FIG. 10 is a top internal view of the top heat transfer device of the computer power supply unit in FIGS. 1A-1C.
Figure 11:
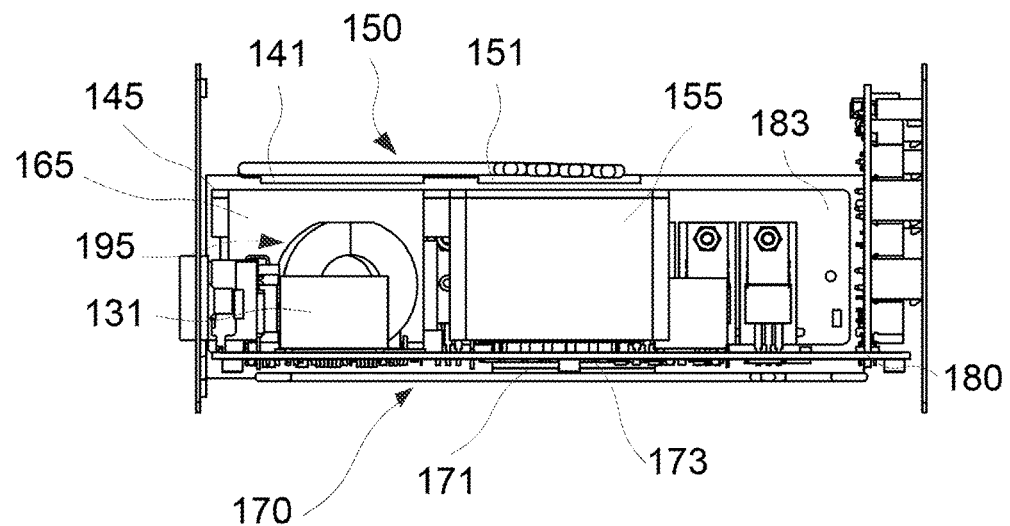
FIG. 11 is an internal side view of the computer power supply unit in FIGS. 1A-1C.
Figure 12:
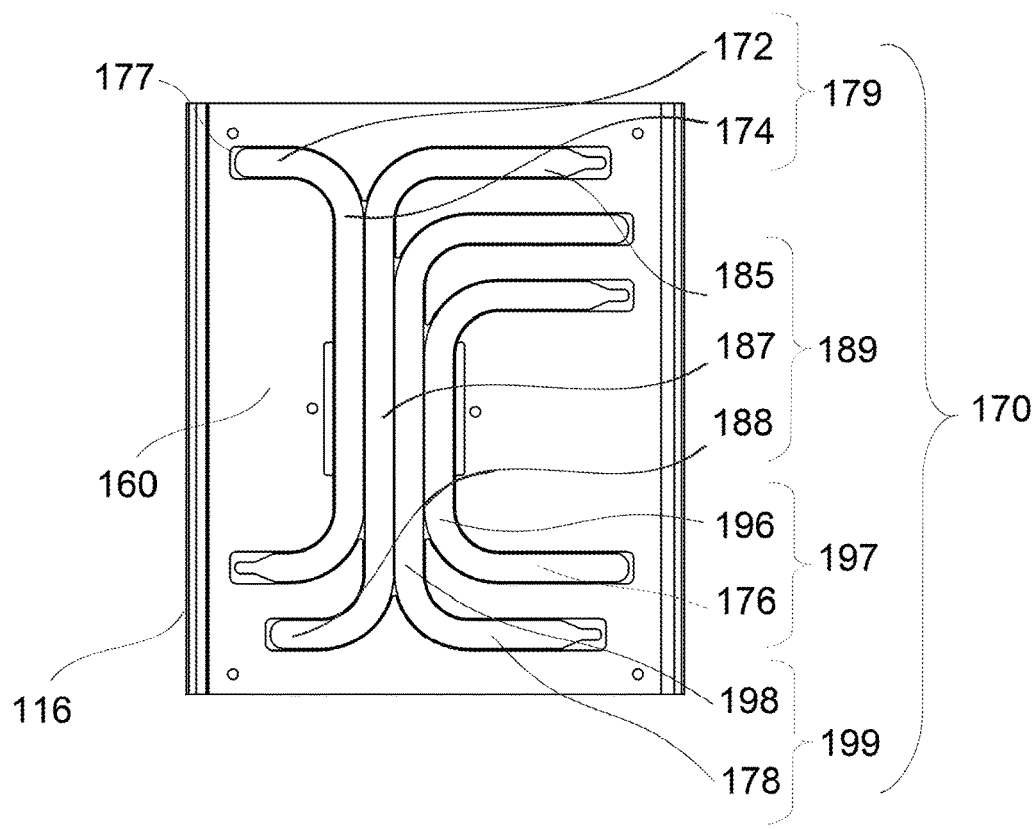
FIG. 12 is an internal view of the bottom heat transfer device embedded in the bottom panel of the computer power supply unit in FIGS. 1A-1C.
Figure 13:
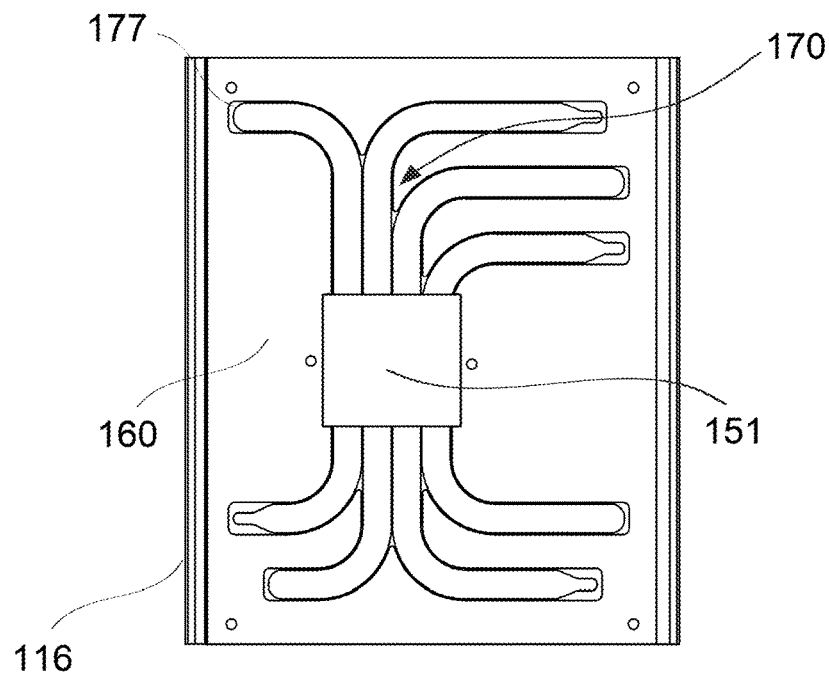
FIG. 13 is an internal view of the bottom heatspreader coupled to the bottom heat transfer device embedded in the bottom panel of the computer power supply unit in FIGS. 1A-1C.
Figure 14:
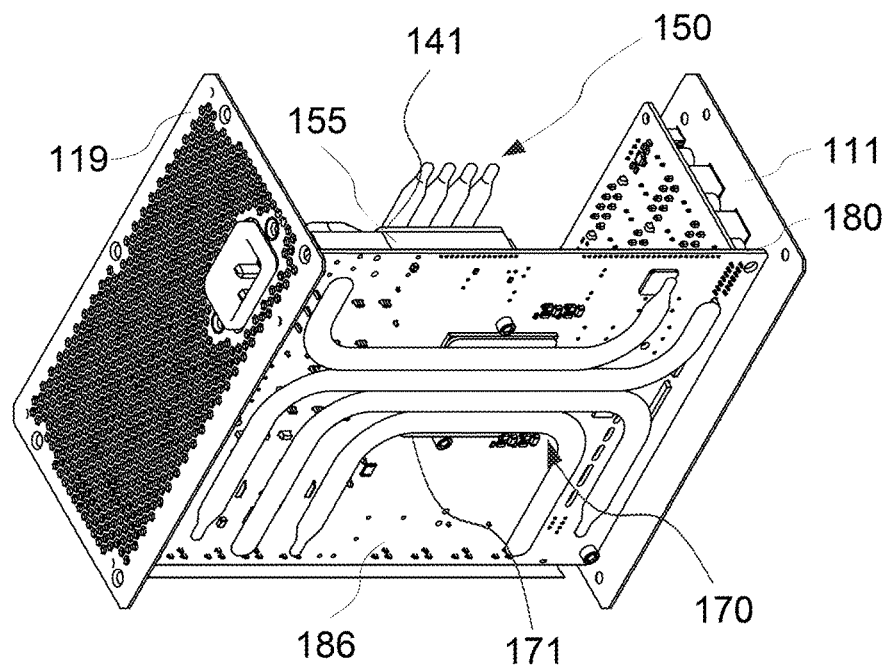
FIG. 14 is an internal bottom angled view of the computer power supply unit in FIGS. 1A-1C.
Figure 15A:
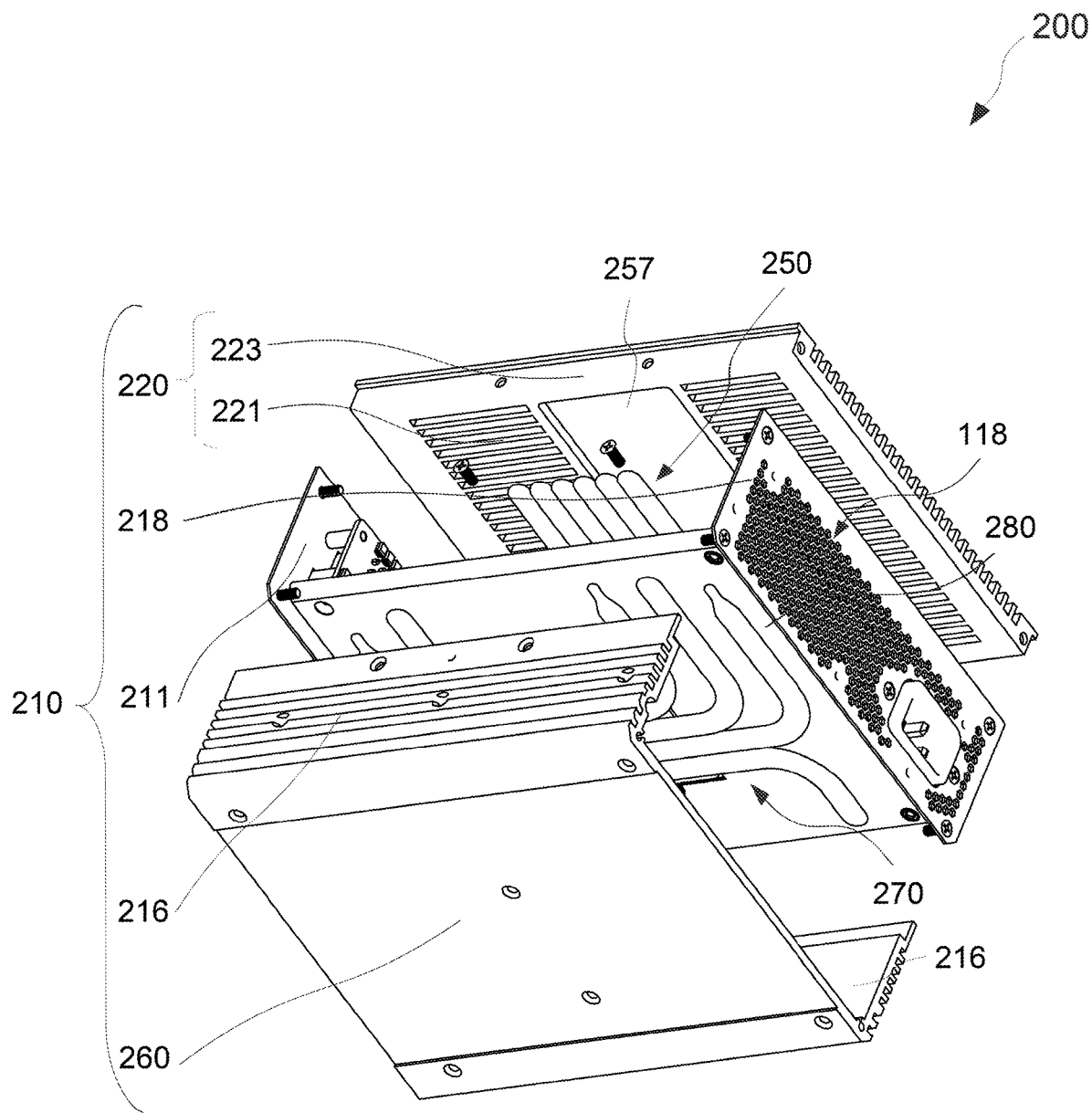
FIG. 15A is an exploded view of a computer power supply unit according to another embodiment of the present disclosure.
Figure 15B:
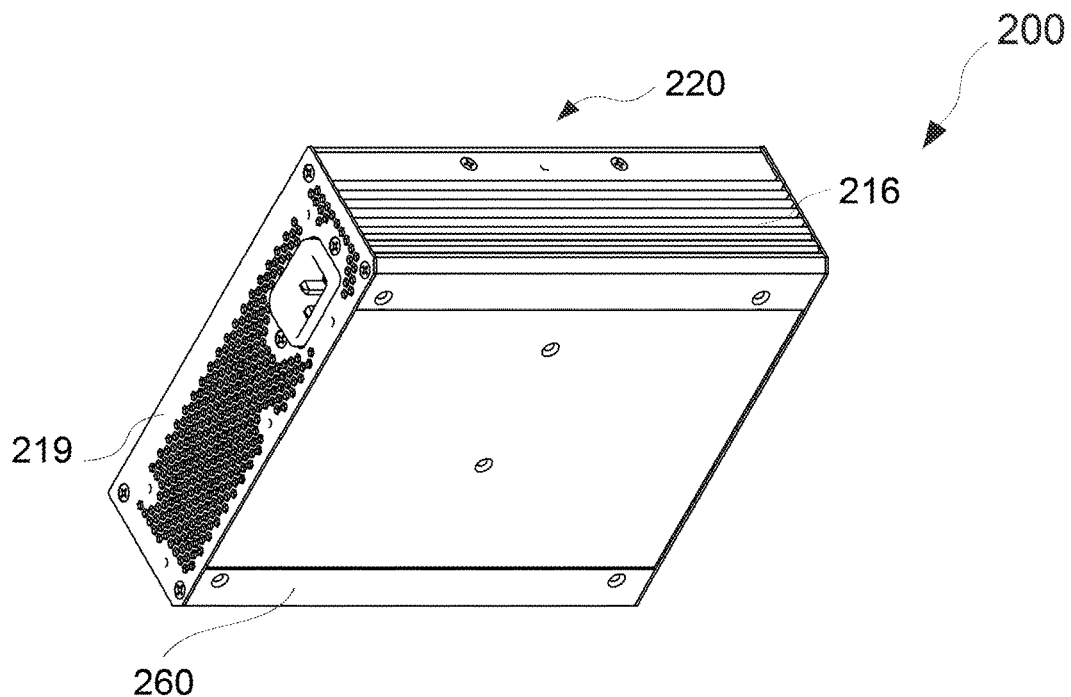
FIG. 15B is a perspective view of the computer power supply unit in FIG. 15A.
Figure 15C:
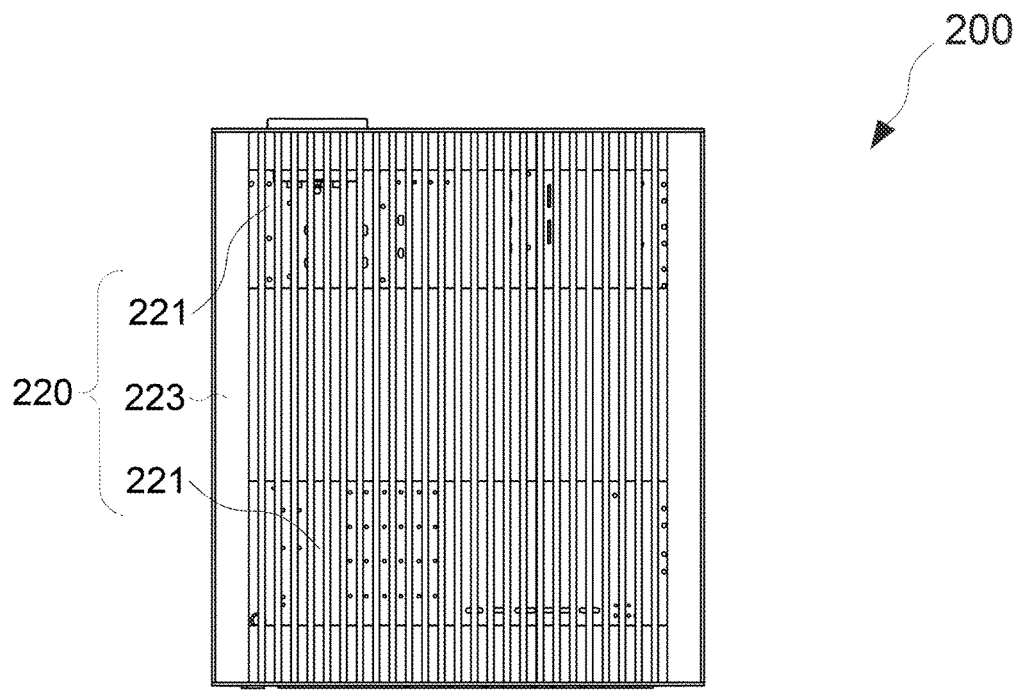
FIG. 15C is a top view of the computer power supply unit in FIG. 15A.
Figure 16:
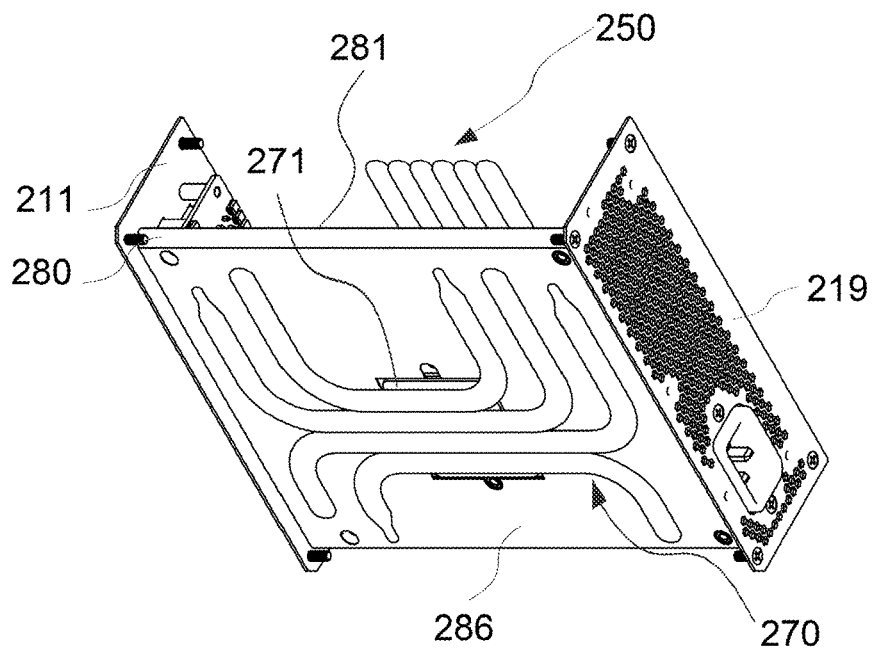
FIG. 16 is an internal bottom angled view of the computer power supply unit in FIGS. 15A-15C.
Figure 17:
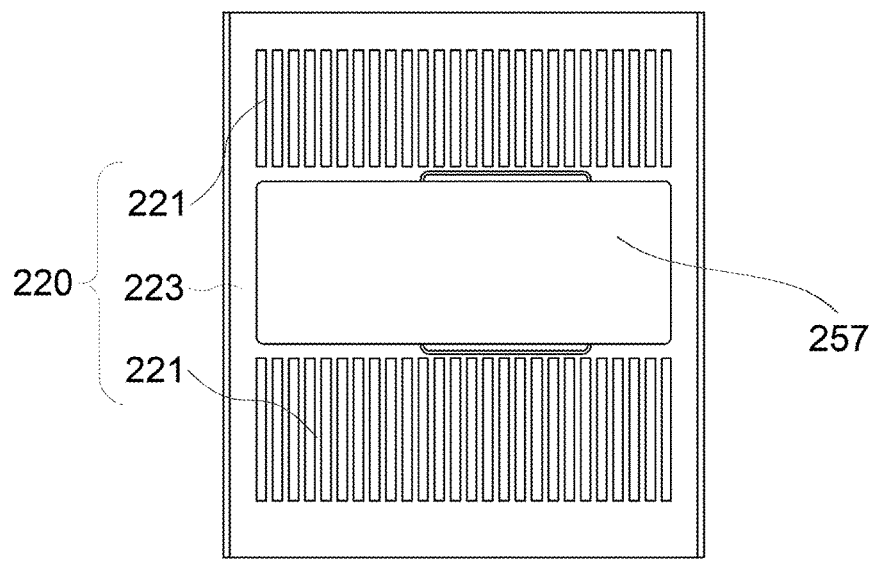
FIG. 17 is an internal view of the top panel of the computer power supply unit in FIGS. 15A-15C.
Figure 18:
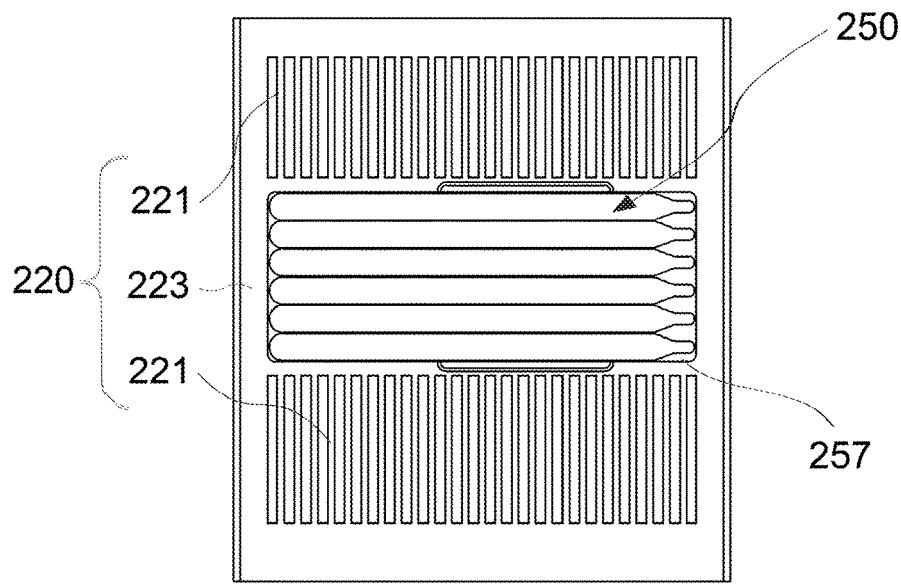
FIG. 18 is an internal view of the top heat transfer device embedded in the top panel of the computer power supply unit in FIGS. 15A-15C.
Figure 19:
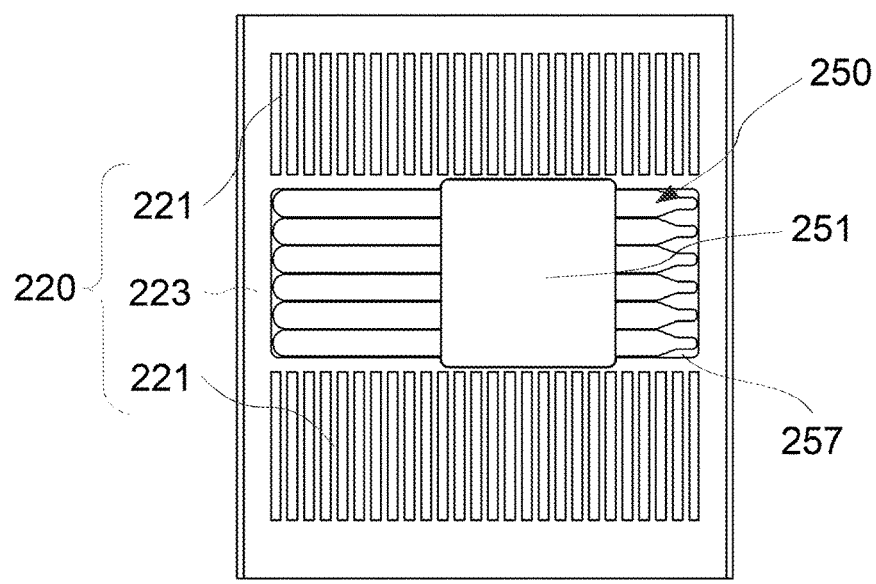
FIG. 19 is an internal view of the top heatspreader coupled to the top heat transfer device embedded in the top panel of the computer power supply unit in FIGS. 15A-15C.
Figure 20:
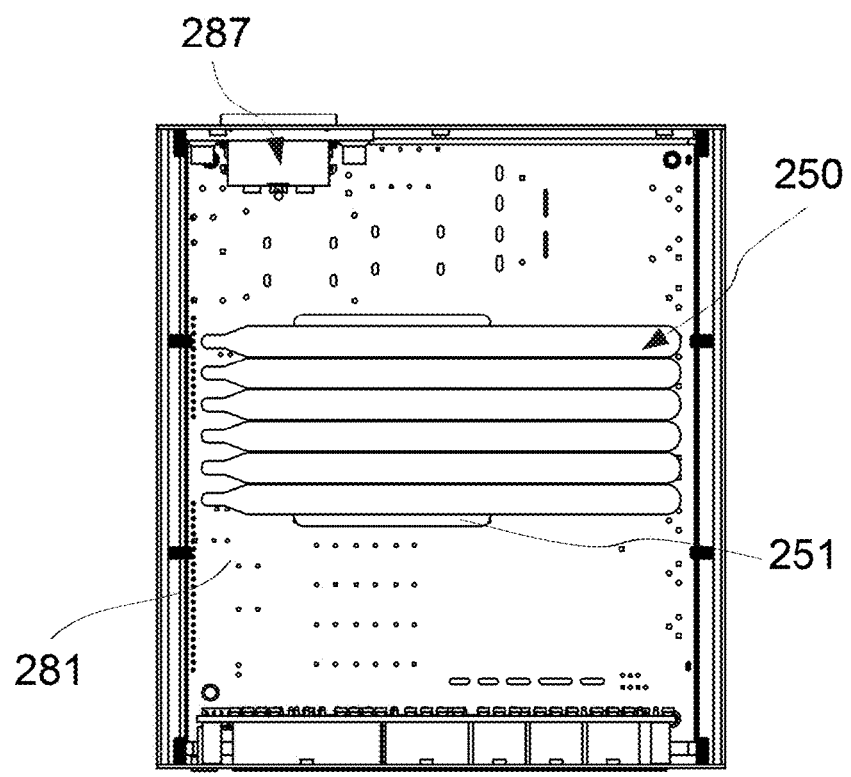
FIG. 20 is an internal top view of the computer power supply unit in FIGS. 15A-15C.

The following describes various principles related to heat transfer systems by way of reference to specific examples of computer power supply units, including specific arrangements and examples of housings, and heat transfer devices embodying innovative concepts. More particularly, but not exclusively, such innovative principles are described in relation to selected examples of heatsinks, heat pipes, and thermal paths and well-known functions or constructions are not described in detail for purposes of succinctness and clarity. Nonetheless, one or more of the disclosed principles can be incorporated in various other embodiments of heatsinks, heat pipes, and thermal paths to achieve any of a variety of desired outcomes, characteristics, and/or performance criteria.

Thus, computer power supply units having attributes that are different from those specific examples discussed herein can embody one or more of the innovative principles, and can be used in applications not described herein in detail. Accordingly, embodiments of computer power supply units not described herein in detail also fall within the scope of this disclosure, as will be appreciated by those of ordinary skill in the relevant art following a review of this disclosure.

Example embodiments as disclosed herein are directed to heat transfer systems in housings of switched mode power supply units (computer power supply units), as an example. Generally, an input DC or rectified AC is 'chopped' at a high frequency, at varying duty cycles, with a semiconductor switch. The semiconductor switch can either be fully on or off. The resulting square wave AC is then rectified and passed through a low pass filter to average the waveform back to DC. The switching duty cycle can be varied to adjust the final DC level and a transformer can be interposed to provide isolation and voltage scaling. The output voltage is then scaled up or down, with or without isolation. The DC output can also be continuously modulated by varying duty cycles and filtered to generate low frequency sinusoidal AC.

The present disclosure provides a computer power supply unit including a housing, at least one high heat producing component and at least one other heat producing component, both disposed on a main board, and a heat transfer system including a bottom heat transfer device and a top heat transfer device, so as to provide five-sided cooling using minimal clearance space, maximizing and enhancing cooling efficiency, increasing reliability, decreasing opportunity for inadequate power to be supplied to the heat producing components, and decreasing the opportunity for malfunction, overheating, or permanent damaged of the heat producing components.

FIGS. 1A-6 include at least one embodiment of a computer power supply unit 100. The computer power supply unit 100, includes a housing 110, a main board 180, at least one high heat producing component 191, at least one other heat producing component 131, and a heat transfer system. The housing 110 is configured to contain heat producing components therein and formed from a thermally conductive material. The housing 110 includes a bottom panel 160, a top panel 120, a pair of opposing side panels 116, a rear panel 118, and a front panel 111. The top panel 120 is opposite the bottom panel 160 and the pair of opposing side panels 116 is between the bottom panel 160 and the top panel 120. The rear panel 118 is between the bottom panel 160 and top panel and between the pair of opposing side panels 116 and the front panel 111 is opposite the rear panel 118 and between the bottom panel 160 and top panel and between the pair of opposing side panels 116. The housing 110 can be a cuboid shape. The main board 180 is configured to contain circuit parts therein and is disposed inside of the housing 110. The main board 180 has a top board side 181 and a bottom board side 186. The bottom board side 186 is disposed facing the bottom panel 160 of the housing 110. The main board 180 can be a quadrilateral shape. The at least one high heat producing component 191 is disposed on the top board side 181. The at least one high heat producing component 191 form a portion of an at least one high heat component assembly 190. The at least one high heat component assembly 190 further includes at least one high heat solder 192 protruding from the bottom board side 186. The at least one other heat producing component 131 is disposed on the top board side 181. The at least one other heat producing component 131 form a portion of an at least one other heat component assembly 130. The at least one other heat component assembly 130 further includes at least one other heat solder 132 protruding from the bottom board side 186. The heat transfer system includes a bottom heat transfer device 170 and a top heat transfer device 150. The bottom heat transfer device 170 is disposed embedded in a bottom panel indentation 177 of the bottom panel 160. The top heat transfer device 150 is disposed encompassed by the top panel 120. The bottom heat transfer device 170 is in thermal communication with the at least one high heat solder 192 and the at least one other heat solder 132. The top heat transfer device 150 is in thermal communication with a top of the at least one high heat producing component 191. A bottom thermal path BTP is formed between the bottom heat transfer device 170 and the bottom panel 160 to dissipate heat BH from the at least one high heat producing component 191 via the at least one high heat solder 192 and dissipate heat BH from the at least one other heat producing component 131 via the at least one other heat solder 132 to an outside of the bottom panel 160. A top thermal path TTP is formed between the top heat transfer device 150 and the top panel 120 to dissipate heat TH from the at least one high heat producing component 191 and dissipate heat TH from the at least one other heat producing component 131 to an outside of the top panel 120.

Each of the pair of opposing side panels 116 is integrally formed with the bottom panel 160 and each of the pair of opposing side panels 116 and the bottom panel 160 are configured as heatsinks. The top panel 120 includes a main portion 123, a ventilation portion 121, and a pair of opposing top side panels 122. The pair of opposing top side panels 122 protrude from opposing perimeter edges of the ventilation portion 121. The main portion 123 is configured as a heatsink.

FIGS. 7-14 include parts of the heat transfer system of the at least one embodiment of the computer power supply unit 100. The top heat transfer device includes a plurality of L-shaped heat pipes 150. Each of the plurality of L-shaped heat pipes 150 include a first leg 157 and a second leg 159 connected to the first leg 157, whereby the plurality of L-shaped heat pipes 150 is embedded in the main portion 123. The heat transfer system further includes a heatsink casing 155, a top thermal interface material 153, and a top heatspreader 151. The heatsink casing 155 encompasses the at least one high heat producing component 191. The top thermal interface material 153 is disposed in contact with a top of the heatsink casing 155. The top heatspreader 151 is disposed in contact with the top thermal interface material 153 and each of the first legs 157 of the plurality of L-shaped heat pipes 150. The computer power supply unit 100 further includes a second high heat producing component 193 and the heat transfer system further includes a second heatsink casing 145 encompassing the second high heat producing component 193, a second top thermal interface material (not shown), and a second top heatspreader 141. The second top thermal interface material is disposed in contact with a top of the second heatsink casing 145. The second top heatspreader 141 is disposed in contact with the second top thermal interface material and each of the second legs 159 of the plurality of L-shaped heat pipes 150. The plurality of L-shaped heat pipes 150 include four adjacent L-shaped heat pipes 150.

The bottom heat transfer device 170 includes a first u-shaped heat pipe 179 having a first base 174 and a first pair of arms 172. The first pair of arms 172 extend in a same direction from each end of the first base 174 toward one of the pair of opposing side panels 116. The heat transfer system further includes a bottom thermal interface material 173 disposed in contact with the at least one high heat solder 192 and a bottom heatspreader 171 disposed in contact with the bottom thermal interface material 173 and a portion of the first base 174. The bottom heat transfer device 170 further includes a modified z-shaped heat pipe 189 having a straight base 187 and two arms 188/185. The two arms 188/185 extend in opposite directions from each end of the straight base 187. The straight base 187 is disposed next to the first base 174. The bottom heat transfer device 170 further includes a second u-shaped heat pipe 199 having a second base 198 and a second pair of arms 178 and a third u-shaped heat pipe 197 having a third base 196 and a third pair of arms 176. The second pair of arms 178 extend in a same direction from each end of the second base 198. The third pair of arms 176 extend in a same direction from each end of the third base 196. The third u-shaped heat pipe 197 is smaller than the second u-shaped heat pipe 199. The second base 198 is disposed next to the straight base 187 opposite of the first base 174. The second pair of arms 178 extend in a direction opposite the first pair of arms 172 toward the other of the pair of opposing side panels 116. The third base 196 is disposed next to the second base 198 opposite of the straight base 187. The third pair of arms 176 extend in a direction which is the same as the second pair of arms 178. A portion of the straight base 187, a portion of the second base 198 and a portion of the third base 196 are all in contact with the bottom heatspreader 171.

In the embodiments, the bottom heatspreader 171 and bottom thermal interface material 173 form include a thicknesses CS. The thicknesses are configured such that the bottom heat pipes 270 do not directly contact the solders of the other heat producing component assemblies, while still assisting with heat conduction therefrom. Thus, additional thermal and non-electrically conductive interface material are not required for the solders of the other heat producing components.

The at least one high heat producing component 191 includes at least one of a main transformer or a bridge rectifier, or any combination of the foregoing. In at least one embodiment, the at least one high heat producing component includes two or more at least one high heat producing components 191/193/194/195, and the computer power supply 100/200/300 further includes a plurality of heatsinks 155/355/145/345/385/165 disposed in contact with the two or more at least one high heat producing components 191/193/194/195. In the embodiments, the at least one high heat producing component 191 and two or more at least one high heat producing components 193/194/195 include at least one of a main transformer, a bridge rectifier, a MOSFET, ferrite coils, invertor transistors, switchers, rectifiers, filtering capacitors, etc., as examples.

FIGS. 15A-20 include another embodiment of a computer power supply unit 200. The computer power supply unit 200 can be similar in some respects to the computer power supply unit 100 of FIGS. 1A-14, and therefore may be best understood with reference thereto where like numerals designate like components not described again in detail.

The computer power supply unit 200, includes a housing 210, a main board 380, at least one high heat producing component 191, at least one other heat producing component (not shown), and a heat transfer system. The housing 210 includes a bottom panel 260, a top panel 220, a pair of opposing side panels 216, a rear panel 218, and a front panel 211. The housing 210 can be an elongated cuboid shape. The main board 280 has a top board side 281 and a bottom board side 286. The main board 180 can be a quadrilateral shape. The at least one high heat producing component form a portion of an at least one high heat component assembly (not shown). The at least one high heat component assembly further includes at least one high heat solder (not shown) protruding from the bottom board side 286. The at least one other heat producing component form a portion of an at least one other heat component assembly (not shown). The at least one other heat component assembly further includes at least one other heat solder (not shown) protruding from the bottom board side 286. The heat transfer system includes a bottom heat transfer device 270 and a top heat transfer device 250. The bottom heat transfer device 270 is disposed embedded in a bottom panel indentation (not shown) of the bottom panel 260. The top heat transfer device 250 is disposed encompassed by the top panel 220. The bottom heat transfer device 270 is in thermal communication with the at least one high heat solder and the at least one other heat solder. The top heat transfer device 250 is in thermal communication with a top of the at least one high heat producing component. A bottom thermal path is formed between the bottom heat transfer device 270 and the bottom panel 260 to dissipate heat from the at least one high heat producing component via the at least one high heat solder and dissipate heat from the at least one other heat producing component via the at least one other heat solder to an outside of the bottom panel 260. A top thermal path is formed between the top heat transfer device 250 and the top panel 220 to dissipate heat from the at least one high heat producing component and dissipate heat from the at least one other heat producing component to an outside of the top panel 220.

Each of the pair of opposing side panels 216 is integrally formed with the bottom panel 260 and each of the pair of opposing side panels 216 are configured as heatsinks. The top panel 220 includes a central portion 223 and a pair of ventilation portions 221. The central portion 223 is configured as a heatsink and disposed between the pair of ventilation portions 221. The top heat transfer device 250 includes a plurality of straight heat pipes 250. The plurality of straight heat pipes 250 is embedded in the central portion 223. The heat transfer system further includes a heatsink casing (not shown), a top thermal interface material (not shown), and a top heatspreader 251. The heatsink casing encompasses the at least one high heat producing component. The top thermal interface material is disposed in contact with a top of the heatsink casing. The top heatspreader is disposed in contact with the top thermal interface material and a portion of each of the plurality of straight heat pipes 250. The plurality of straight heat pipes 250 include six adjacent straight heat pipes 250.

Figure 21A:
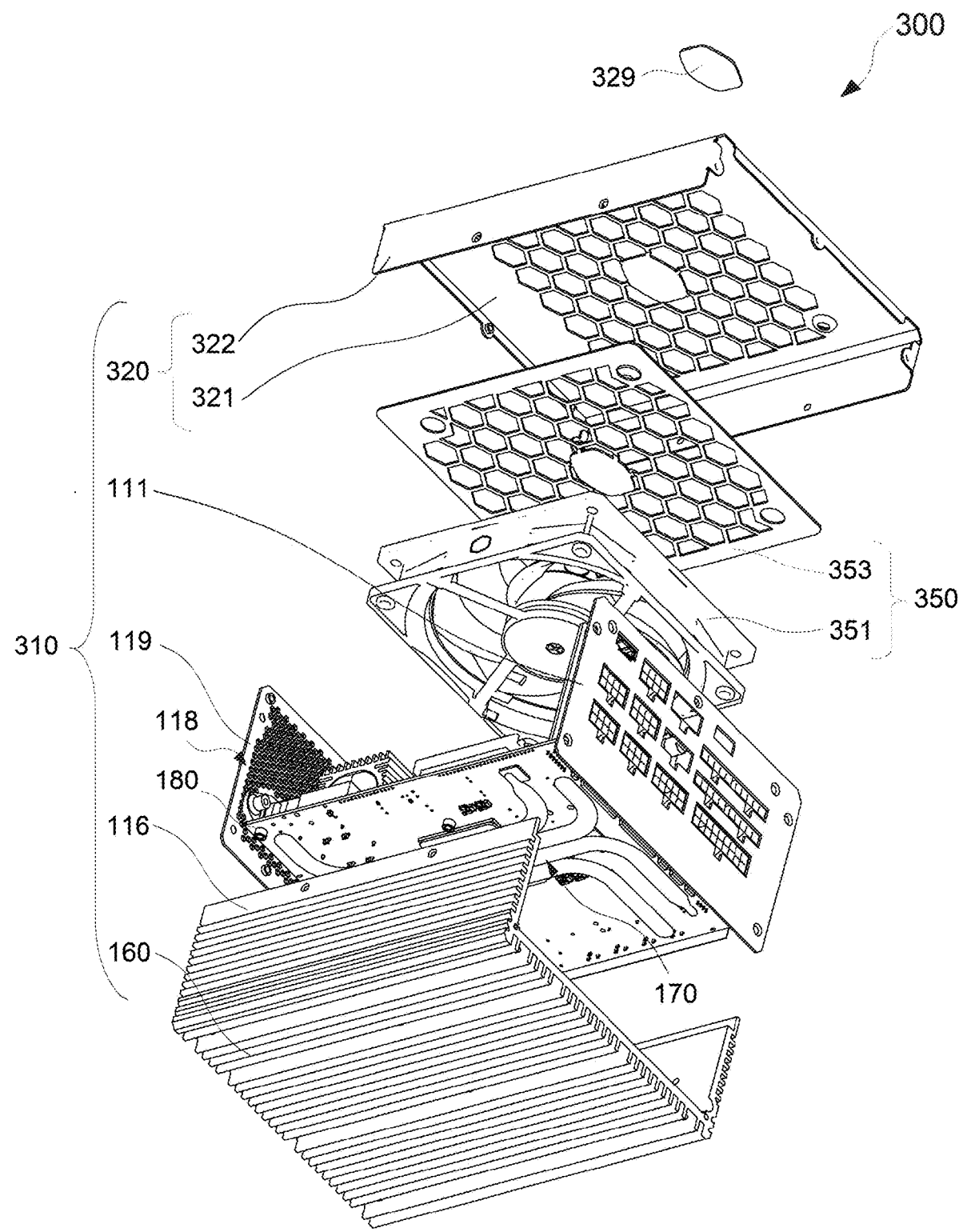
FIG. 21A is an exploded view of a computer power supply unit according to yet another embodiment of the present disclosure.
Figure 21B:
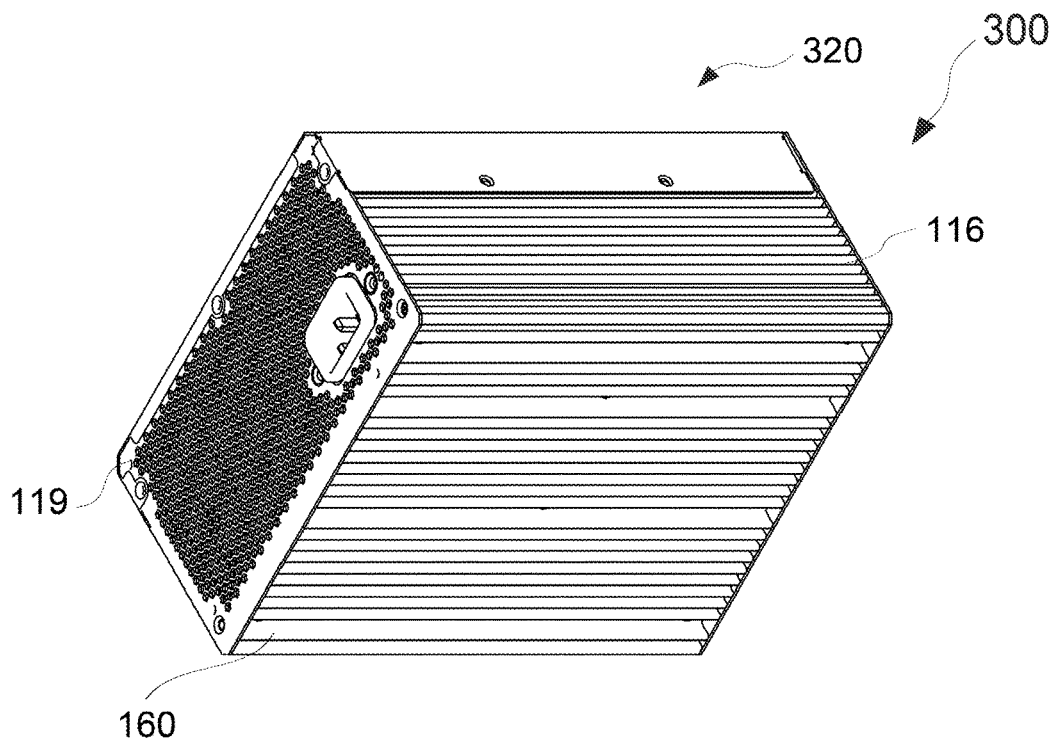
FIG. 21B is a perspective view of the computer power supply unit in FIG. 21A.
Figure 21C:
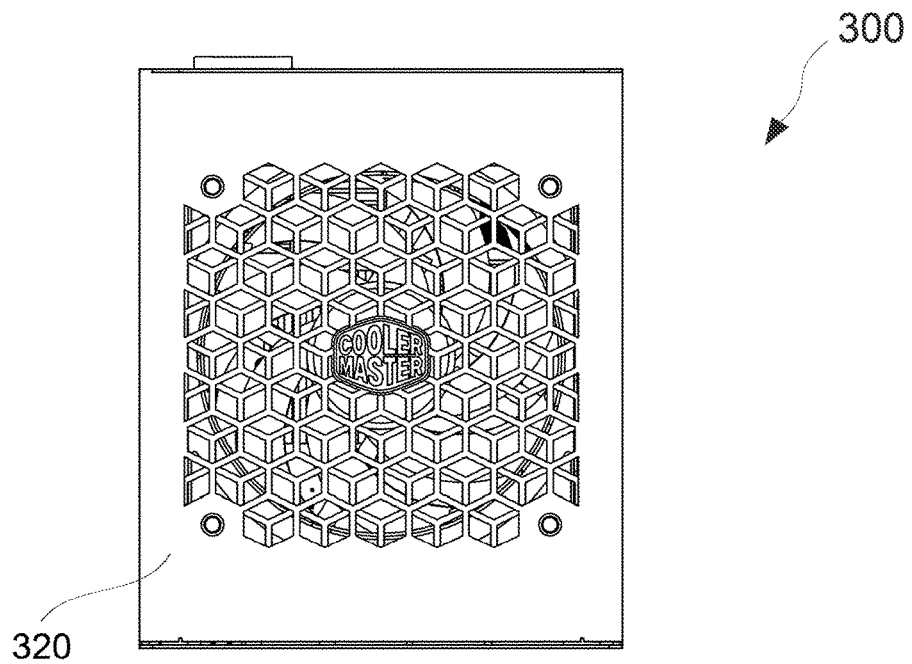
FIG. 21C is a top view of the computer power supply unit in FIG. 21A.
Figure 22:
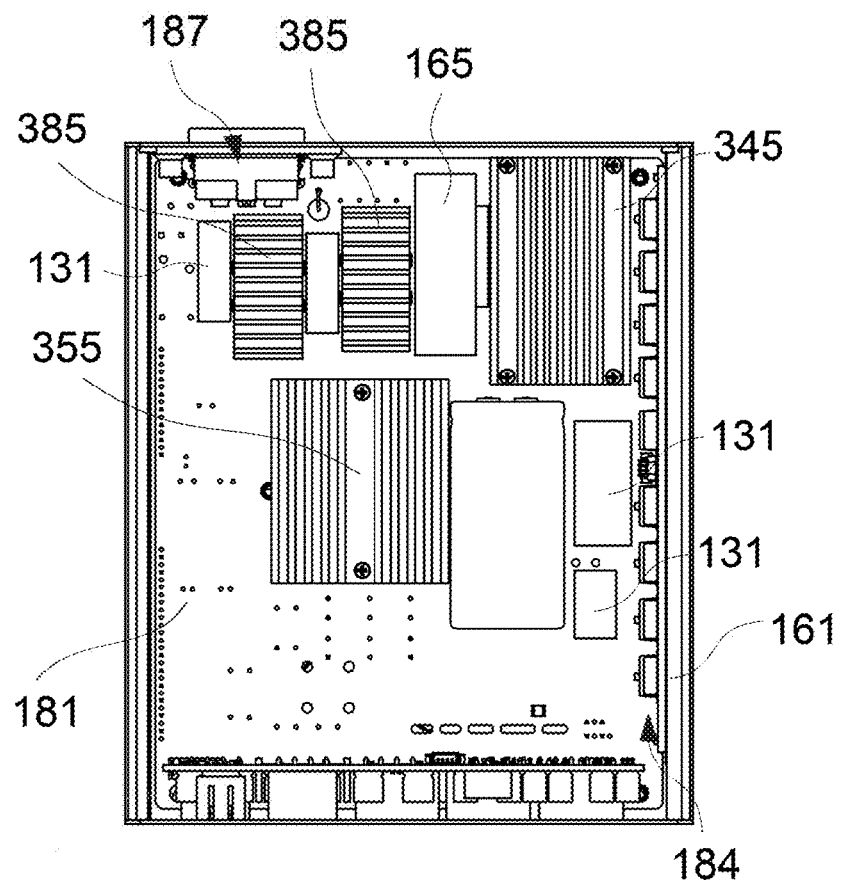
FIG. 22 is an internal top view of the heatsinks of the computer power supply unit in FIG. 21A.

FIGS. 21A-22 include yet another embodiment of a computer power supply unit 300. The computer power supply unit 300 can be similar in some respects to the computer power supply unit 100 of FIGS. 1A-14, and therefore may be best understood with reference thereto where like numerals designate like components not described again in detail.

The top panel 320 of the computer power supply unit 300 includes a fan ventilation portion 321 and a pair of opposing top side panels 322 and the top heat transfer device includes a fan 350 having a fan assembly 351 and fan grill 353. The computer power supply unit 300 further includes a label 329. The label 329 can be disposed on the top panel 320. The pair of opposing top side panels 322 protrude from opposing perimeter edges of the fan ventilation portion 321. The fan grill 353 is disposed between the fan assembly 351 and fan ventilation portion 321 and the fan 350 is encompassed by the top panel 320. The fan 350 can be coupled to structural portions of the computer power supply unit 300 via a fastener (e.g., bolts, screws, an adhesive material, etc.), transporting air through the housing 310 to an outside of the housing 310.

The computer power supply unit 300 includes the at least one high heat producing component 191 and the second high heat producing component 193, and the heat transfer system includes the heatsink casing 355 and further includes a second heatsink casing 345. The heatsink casing 355 encompasses the at least one high heat producing component 191 and the second heatsink casing 345 encompasses the second high heat producing component 193.

In the embodiments, the plurality of heatsinks can be heatsink casings 155/355/145/345/385 partially or completely encompassing the two or more at least one high heat producing components 191/193/195 and/or flat heatsinks 165 disposed thermally coupling the two or more at least one high heat producing components 194, or any combination of the foregoing.

The fan 350, thermally communicating with the heatsink casings 155/355/145/345/385 of the high heat producing components 191/193/195, flat heatsinks 165 of the two or more at least one high heat producing components 194, and other heat producing components 131 disposed on the top board side 181 of the main board 180 maximizes and enhances cooling in the housing 110. Notwithstanding, RPM required of the fan 350 for efficient dissipation is minimized due to the pair of opposing side panels 116 configured as heatsinks and the at least one of the pair of opposing side panels 116 thermally coupling to the other side heat producing component assemblies 184, due to cooling from the honey comb mesh 118 of the rear panel 118, and due to the bottom thermal path BTP formed between the bottom heat transfer device 170 and the bottom panel 160. Thus, noise and vibration due to the fan 350 is decreased and reliability concerns due to dust, dirt or the like being sucked into the housing 310 and fan maintenance, and replacement costs are also decreased.

In at least one embodiment, the wattage of the computer power supply unit 300 includes 1,300 W, the size of the fan 350 is 120 mm in diameter, and the RPM of the fan 350 is less than 1,800 RPMs.

In the embodiments, the fan 350 can conform to the ATX, ATX12V, TFX, SFX-L, SFX, or EPS12V specifications and be 80 mm, 92 mm, 120 mm, and 140 mm in diameter and can include speeds of 300-3,000 RPMs. In the embodiments, the wattage of the computer power supply units 100/200/300 can include 750-1,300 W.

In the embodiments, the heat pipes 170/270/150/250 transfer heat by boiling (evaporator) and condensation (condenser) of a working fluid in a fully-enclosed vacuum pipe. The vapor produced in the boiling section flows rapidly into the condensation section where it is cooled and turned into a liquid which flows back into the boiling section by free fall or through a wick structure.

It should be noted that the heat pipes of the bottom heat transfer device 170/270 are arranged to not only contact the heatspreader 171/271, thermally coupled to the at least one high heat solder 192 of the at least one high heat component assembly 190, but, are also extended to be exposed and available to dissipate heat from the two or more at least one high heat producing component assemblies of the two or more at least one high heat producing components and the at least one other heat solder of the at least one other heat producing component assembly of the at least one other heat producing component. As an example, the bottom heat transfer device 170/270 is extended to encompass over 50% of an area of the bottom board side 186/286 of the main board 180/280.

It should be noted that the heat pipes of the top heat transfer device 150/250 are arranged to not only contact the heatspreader 151/251, thermally coupled to the heatsink casing 155 of the at least one high heat component assembly 190, and, arranged to contact the second top heatspreader 141, thermally coupled to the second heatsink casing 145 of the second high heat producing component 193, but, can also be exposed and available to dissipate heat from other heat producing components in the housing 110/210.

In the embodiments, the computer power supply units 100/200/300 as described herein can comply with the standards specified in the ATX, ATX12V, TFX, SFX-L, SFX, or EPS12V specifications, as examples. In the embodiments, the front panel 111/211 can include modular 24-pin, 4-pin, 8-pin, 6-pin PCIe, 8-pin PCIe, 16-pin PCIe, Molex, floppy, and SATA power connector slots, as examples. In the embodiments, the back panel 119/219 can include a power cord inlet. In the embodiments, the main board 180/280 can be a printed circuit board having the high heat producing component assemblies and other heat producing component assemblies mounted thereto.

In the embodiments, each of the other side heat producing component assemblies 194 can include other side heat solders (not shown) and can be mounted to one or more side boards 183 (or daughter boards) mounted to the main board 180. In at least one embodiment, the heat transfer system further includes a side thermal interface material (not shown), and a side heatspreader 161. The side thermal interface material is disposed in contact with the other side heat solders. The side heatspreader 161 is disposed in contact with the side thermal interface material and one of the pair of opposing side panels 116 for enhanced heat dissipation.

In the embodiments, the pair of opposing side panels 116/216, the bottom panel 160, the main portion 123 of the top panel 120, and the central portion 223 of the top panel 220 are configured as heatsinks. The heatsinks radiate heat generated by the high heat producing component assemblies, other heat producing component assemblies, other side heat producing component assemblies, and circuit parts through the heat radiation fins exposed to the outside of the housing 110/210/310. In the embodiments, the heatsink panels 116/216/160/123/223 and plurality of heatsinks 155/355/145/345/385/165 are made of aluminum or copper, as examples.

In the embodiments, the thermal interface materials 153/173 can include thermal pads, thermally conductive adhesives, thermal paste, thermally conductive putties, thermal conductive sheets, and phase change materials, as examples. In the embodiments, the thermal interface materials can be disposed in contact with the tops of the heatsink casings and disposed thermal coupling the high heat solders of the high heat component assemblies. The thermal interface materials accelerate heat transfer by filling the gap between the tops of the heatsink casings and the top heatspreader and by filling the gap between the high heat solders and the bottom heatspreader. In the embodiments, the thermal interface materials can also be disposed on the tops of the top heatspreaders and bottom heatspreaders, accelerating heat transfer by filling the gap between the tops of the top heatspreader and bottom heatspreader and the portions of the heat pipes. In the embodiments, the thermal interface materials can also be disposed between the high heat producing components and heatsink casings, accelerating heat transfer by filling the gaps between outer surfaces of the high heat producing components and internal surfaces of the heatsink casings.

In the embodiments, the heatspreader material can include silicone, aluminum, copper, diamond, ceramic, and any combination of the foregoing, as examples, each having the appropriate thermal conductivity and, in some instances, electrically non-conductivity. In the embodiments, the heatspreader 151/141/251 can be disposed in contact with the tops of the heatsink casings 155/145 and portions of the top heat pipes 150/250. The heatspreaders accelerate heat transfer by moving heat from the high heat producing component assemblies and heatsink casings 155/145 to a heat exchanger with a larger cross sectional area, surface area and volume.

The computer power supply units 100/200/300 of the present disclosure assure that adequate power is supplied to heat producing components of electronic systems via the housing 110/210/310 and heat transfer system. Thermal paths BTP/TTP are formed between the bottom heat transfer device 170/270 and bottom panel 160/260 and the top heat transfer device 150/250/350 and top panel 120/220/320 to dissipate heat from the high heat component assemblies and other heat component assemblies to the outsides of the bottom and top panels 160/260/120/220/320. Along with the rear panel 118/218 and pair of opposing side panels 116/216, five-sided panel cooling is achieved 160/260, 116/216, 116/216, 118/218, 120/220/320. With adequate power, the opportunity for an electronic system's components to malfunction, overheat, or be permanently damaged is decreased. With heat dissipation efficiency increased, reliability of the computer power supply units 100/200/300 is also increased.

The computer power supply units 100/200/300 of the present disclosure maximizes and enhances the heat dissipation area available from the housing 110/210/310. The heat pipes 150/250 of the top heat transfer devices are embedded in the main portion 123 or central portion 223 of the top panel 120/220 and extend throughout the main portion 123 or central portion 223 to dissipate heat to the outside of the top panel 120/220. The heat pipes 150/250 are not only thermally coupled to heatsink casings 155/145 of the high heat producing components 191/193, but also thermally communicate with the other heat producing components disposed on the top board side 181/281 of the main board 180/280, maximizing and enhancing cooling in the housing 110/210. Alternatively, the fan 350 may thermally communicate with the heatsink casings 355/345 of the high heat producing components and other heat producing components disposed on the top board side 181 of the main board 180 to also maximize and enhance cooling in the housing 310. Cooling from the honey comb mesh 118 and/or elongated rectangular cooling vents of the ventilation portion 121 and the pair of ventilation portions 221 of the top panels 120/220 and rear panel 119/219 are also provided. Further cooling in the housing 110/210/310 is enhanced via the pair of opposing side panels 116/216 configured as heatsinks. At least one of the pair of opposing side panels 116, thermally coupled to the other side heat producing component assemblies 194 in the housing 110/310, further enhances cooling in the housing 110/310.

Five-sided cooling of the computer power supply units 100/200/300 of the present disclosure is achieved via the heat pipes of the bottom heat transfer device 170/270. The heat pipes 170/270 are embedded in the bottom panel 160/260 and extend throughout the bottom panel 160/260 area. The heat pipes 170/270 are not only thermally coupled to the high heat solder 192 of the high heat producing component assembly 190, but also thermally communicate with the other heat producing component assemblies disposed on the bottom board side 186 of the main board 180 to further maximize and enhance cooling in the housing 110/210.

Furthermore, with the heat pipes 170/270 being embedded in the bottom panel 160/260, additional support, brackets or structures of the computer power supply units 100/200/300 are not required. Additionally, given the thicknesses CS of the bottom heatspreader 171/271 and bottom thermal interface material 173, the bottom heat pipes 170/270 do not directly contact the solders of the other heat producing component assemblies, while still assisting with heat conduction therefrom. Thus, additional thermal and non-electrically conductive interface material are not required for the solders of the other heat producing components. Also, given a same PSU form factor dimension, cooling surface area of the housing 110/210 of the computer power supply units 100/200/300 is maximized and enhanced using minimal clearance space of the thicknesses CS of the bottom heatspreader 171/271 and bottom thermal interface material 173.

Moreover, with five-sided cooling of the computer power supply units 100/200/300, RPM required for forced air cooling for efficient heat dissipation of the computer power supply units 100/200/300 is decreased. Thus, noise and vibration is decreased and reliability concerns due to dust, dirt or the like being sucked into the housing 110/210 and fan 350 maintenance, and replacement costs are also decreased.

Therefore, embodiments disclosed herein are well adapted to attain the ends and advantages mentioned as well as those that are inherent therein. The particular embodiments disclosed above are illustrative only, as the embodiments disclosed may be modified and practiced in different but equivalent manners apparent to those of ordinary skill in the relevant art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some number. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A computer power supply unit, comprising:
   a housing configured to contain heat producing components therein, comprising a bottom panel, a top panel opposite the bottom panel, a pair of opposing side panels between the bottom panel and the top panel, a rear panel between the bottom panel and top panel and between the pair of opposing side panels, and a front panel opposite the rear panel and between the bottom panel and top panel and between the pair of opposing side panels, the housing being formed from a thermally conductive material;
   a main board configured to contain circuit parts therein, disposed inside of the housing, the main board having a top board side and a bottom board side, the bottom board side disposed facing the bottom panel of the housing;
   at least one high heat producing component disposed on the top board side, the at least one high heat producing component forming a portion of an at least one high heat component assembly, the at least one high heat component assembly further comprising at least one high heat solder protruding from the bottom board side;
   at least one other heat producing component disposed on the top board side, the at least one other heat producing component forming a portion of an at least one other heat component assembly, the at least one other heat component assembly further comprising at least one other heat solder protruding from the bottom board side;
   a heat transfer system comprising a bottom heat transfer device and a top heat transfer device, the bottom heat transfer device disposed embedded in the bottom panel, the top heat transfer device disposed encompassed by the top panel, the bottom heat transfer device in thermal communication with the at least one high heat solder and the at least one other heat solder, the top heat transfer device in thermal communication with a top of the at least one high heat producing component,
   wherein a bottom thermal path is formed between the bottom heat transfer device and the bottom panel to dissipate heat from the at least one high heat producing component via the at least one high heat solder and dissipate heat from the at least one other heat producing component via the at least one other heat solder to an outside of the bottom panel and a top thermal path is formed between the top heat transfer device and the top panel to dissipate heat from the at least one high heat producing component and dissipate heat from the at least one other heat producing component to an outside of the top panel.

2. The computer power supply unit of claim 1, wherein each of the pair of opposing side panels is integrally formed with the bottom panel and each of the pair of opposing side panels and the bottom panel are configured as heatsinks.

3. The computer power supply unit of claim 2, wherein the top panel comprises a main portion, a ventilation portion, and a pair of opposing top side panels, the pair of opposing top side panels protrude from opposing perimeter edges of the ventilation portion, the main portion configured as a heatsink.

4. The computer power supply unit of claim 3, wherein the top heat transfer device comprises a plurality of L-shaped heat pipes, each of the plurality of L-shaped heat pipes include a first leg and a second leg connected to the first leg, the plurality of L-shaped heat pipes embedded in the main portion.

5. The computer power supply unit of claim 4, wherein the heat transfer system further comprises a heatsink casing encompassing the at least one high heat producing component, a top thermal interface material disposed in contact with a top of the heatsink casing and a top heatspreader disposed in contact with the top thermal interface material and each of the first legs of the plurality of L-shaped heat pipes.

6. The computer power supply unit of claim 5, further comprising a second high heat producing component, wherein the heat transfer system further comprises a second heatsink casing encompassing the second high heat producing component, a second top thermal interface material disposed in contact with a top of the second heatsink casing and a second top heatspreader disposed in contact with the second top thermal interface material and each of the second legs of the plurality of L-shaped heat pipes.

7. The computer power supply unit of claim 4, wherein the plurality of L-shaped heat pipes include four adjacent L-shaped heat pipes.

8. The computer power supply unit of claim 2, wherein the top panel comprises a fan ventilation portion and a pair of opposing top side panels, and wherein the top heat transfer device comprises a fan, the pair of opposing top side panels protrude from opposing perimeter edges of the fan ventilation portion, the fan is encompassed by the top panel.

9. The computer power supply unit of claim 8, further comprises a second high heat producing component, and wherein the heat transfer system further comprises a heatsink casing and a second heatsink casing, the heatsink casing encompass the at least one high heat producing component, the second heatsink casing encompass the second high heat producing component.

10. The computer power supply unit of claim 1, wherein each of the pair of opposing side panels is integrally formed with the bottom panel and each of the pair of opposing side panels are configured as heatsinks.

11. The computer power supply unit of claim 10, wherein the top panel further has a central portion and a pair of ventilation portions, the central portion configured as a heatsink, and the central portion disposed between the pair of ventilation portions.

12. The computer power supply unit of claim 11, wherein the top heat transfer device comprises a plurality of straight heat pipes, the plurality of straight heat pipes embedded in the central portion.

13. The computer power supply unit of claim 12, wherein the heat transfer system further comprises a heatsink casing encompassing the at least one high heat producing component, a top thermal interface material disposed in contact with a top of the heatsink casing and a top heatspreader disposed in contact with the top thermal interface material and a portion of each of the plurality of straight heat pipes.

14. The computer power supply unit of claim 1, wherein the bottom heat transfer device comprises a first u-shaped heat pipe having a first base and a first pair of arms extending in a same direction from each end of the first base.

15. The computer power supply unit of claim 14, wherein the heat transfer system further comprises a bottom thermal interface material disposed in contact with the at least one high heat solder and a bottom heatspreader disposed in contact with the bottom thermal interface material and a portion of the first base.

16. The computer power supply unit of claim 15, wherein the bottom heat transfer device further comprises a modified z-shaped heat pipe having a straight base and two arms extend in opposite directions from each end of the straight base, the straight base disposed next to the first base, and wherein the bottom heat transfer device further comprises a second u-shaped heat pipe having a second base and a second pair of arms extend in a same direction from each end of the second base, and a third u-shaped heat pipe having a third base and a third pair of arms extend in a same direction from each end of the third base, the third u-shaped heat pipe smaller than the second u-shaped heat pipe, the second base disposed next to the straight base opposite of the first base, the second pair of arms extend in a direction opposite the first pair of arms, the third base disposed next to the second base opposite of the straight base, the third pair of arms extend in a direction which is the same as the second pair of arms, a portion of the straight base, a portion of the second base and a portion of the third base are all in contact with the bottom heatspreader.

17. The computer power supply unit of claim 1, wherein the at least one high heat producing component comprises at least one of a main transformer or a bridge rectifier, or any combination of the foregoing.

18. The computer power supply unit of claim 1, wherein the at least one high heat producing component includes two or more at least one high heat producing component, and the computer power supply further comprises a plurality of heatsinks disposed in contact with the two or more at least one high heat producing components.

* * * * *